(12) United States Patent
Nakamura

(10) Patent No.: US 9,581,077 B2
(45) Date of Patent: Feb. 28, 2017

(54) VARIABLE COMBUSTION SYSTEM FOR AN INTERNAL COMBUSTION ENGINE

(71) Applicant: Hitachi Automotive Systems, Ltd., Hitachinaka-shi, Ibaraki (JP)

(72) Inventor: Makoto Nakamura, Zushi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 172 days.

(21) Appl. No.: 14/658,588

(22) Filed: Mar. 16, 2015

(65) Prior Publication Data

US 2016/0076436 A1    Mar. 17, 2016

(30) Foreign Application Priority Data

Sep. 11, 2014 (JP) ................. 2014-185231

(51) Int. Cl.
*F02B 9/04* (2006.01)
*F02B 11/00* (2006.01)
(Continued)

(52) U.S. Cl.
CPC .............. *F02B 11/00* (2013.01); *F01L 1/185* (2013.01); *F01L 1/3442* (2013.01); *F01L 13/0026* (2013.01); *F02D 13/0207* (2013.01); *F02D 13/0219* (2013.01); *F02D 13/0265* (2013.01); *F02D 15/02* (2013.01); *F02D 41/006* (2013.01); *F02D 41/0057* (2013.01); *F02D 41/06* (2013.01); *F02D 41/3035* (2013.01);
(Continued)

(58) Field of Classification Search
CPC ...... F02B 11/00; F02D 15/02; F02D 13/0207; F02D 13/0219; F02D 41/0057; F02D 41/006; F02D 41/06; F02D 41/064; F02D 41/3035; F02D 41/3076; F02D 2200/021; F02M 26/01; F01L 1/185; F01L 1/267
USPC ................... 123/568.11–568.32, 48 R–48 D, 123/78 R–78 F
See application file for complete search history.

(56) References Cited

U.S. PATENT DOCUMENTS 6,213,086 B1 * 4/2001 Chmela ..................... F02B 1/12
123/179.5
6,336,436 B1 * 1/2002 Miyakubo .............. F02M 26/01
123/295

(Continued)

FOREIGN PATENT DOCUMENTS

JP          11-264319 A       9/1999
JP          2002-276446 A     9/2002
JP          2013-227941       11/2013

*Primary Examiner* — Marguerite McMahon
(74) *Attorney, Agent, or Firm* — Foley & Lardner LLP

(57) ABSTRACT

A variable combustion system for an internal combustion engine, which suppresses mechanical compression ratio change control by a variable mechanical compression ratio control mechanism and carries out internal EGR amount change control by a variable valve actuating control mechanism on a preferential basis in a first operating region in which a compression self-ignition combustion is carried out, and which suppresses the internal EGR amount change control by the variable valve actuating control mechanism and carries out the mechanical compression ratio change control by the variable mechanical compression ratio control mechanism on a preferential basis in a second operating region in which a spark ignition combustion is carried out.

14 Claims, 19 Drawing Sheets

(51) Int. Cl.
  *F02D 15/02*    (2006.01)
  *F02D 13/02*    (2006.01)
  *F02D 41/00*    (2006.01)
  *F02D 41/06*    (2006.01)
  *F02D 41/30*    (2006.01)
  *F01L 1/18*     (2006.01)
  *F01L 1/344*    (2006.01)
  *F01L 13/00*    (2006.01)
  *F01L 1/26*     (2006.01)

(52) U.S. Cl.
  CPC ......... *F02D 41/3076* (2013.01); *F02M 26/01* (2016.02); *F01L 1/267* (2013.01); *F01L 2001/3443* (2013.01); *F01L 2001/34469* (2013.01); *F01L 2001/34479* (2013.01); *F01L 2001/34483* (2013.01); *F01L 2013/0073* (2013.01); *F01L 2105/00* (2013.01); *F01L 2250/02* (2013.01); *F01L 2250/04* (2013.01); *F01L 2800/00* (2013.01); *F01L 2800/01* (2013.01); *F02D 41/064* (2013.01); *F02D 2200/021* (2013.01)

(56) References Cited

U.S. PATENT DOCUMENTS

| | | | |
|---|---|---|---|
| 6,739,295 B1* | 5/2004 | Yamaoka | F02M 26/01 123/406.41 |
| 2007/0215126 A1* | 9/2007 | Shiraishi | F02D 15/02 123/568.14 |
| 2008/0010000 A1* | 1/2008 | Casal Kulzer | F02D 13/0265 701/104 |
| 2008/0167786 A1* | 7/2008 | Sasaki | F02D 35/023 701/102 |
| 2008/0236546 A1* | 10/2008 | Kakuho | F02B 17/005 123/406.3 |
| 2009/0320788 A1* | 12/2009 | Ohtsubo | F02B 1/14 123/295 |
| 2012/0216776 A1* | 8/2012 | Nagatsu | F02D 13/0234 123/305 |
| 2013/0025571 A1* | 1/2013 | Ashizawa | F01L 3/085 123/48 R |
| 2013/0284146 A1 | 10/2013 | Tsujita et al. | |
| 2015/0114355 A1* | 4/2015 | Choi | F02D 41/3047 123/48 R |

* cited by examiner

PEAK LIFT TIMING

PEAK LIFT AMOUNT L1 (Sb)

FIG. 6A
NON-LIFT TIMING
CROSS SECTION (A)   CROSS SECTION (B)
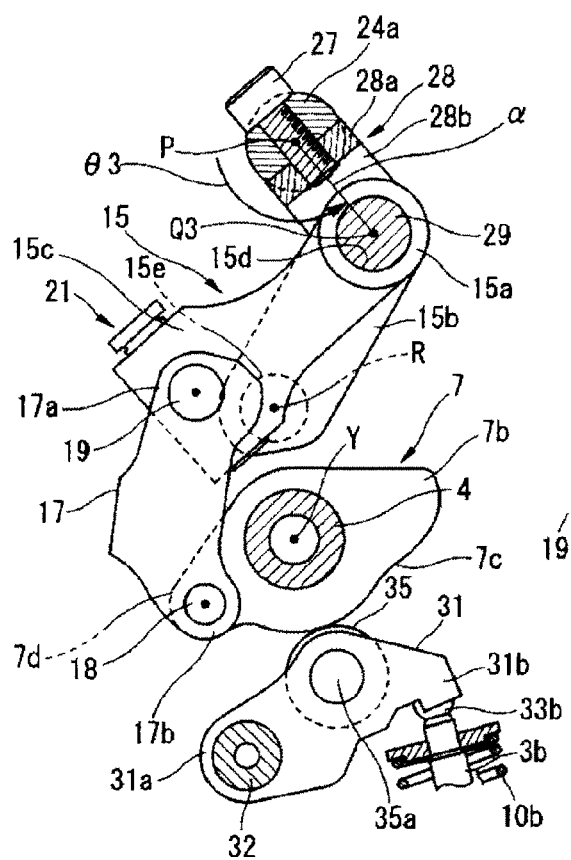
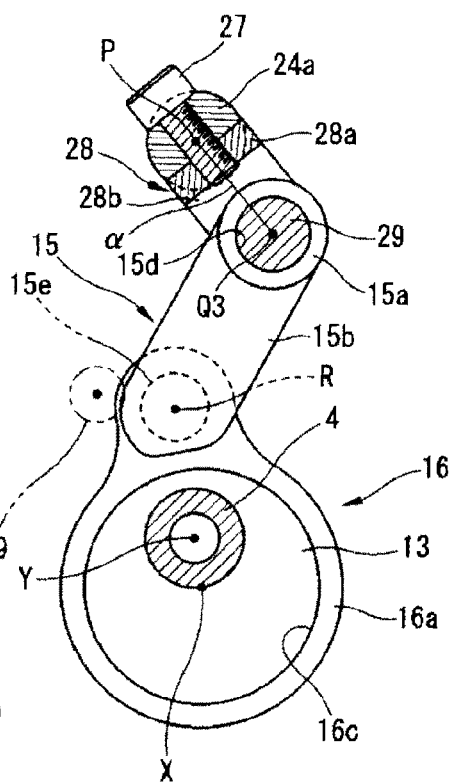

FIG. 6B
PEAK LIFT TIMING
CROSS SECTION (A)     CROSS SECTION (B)
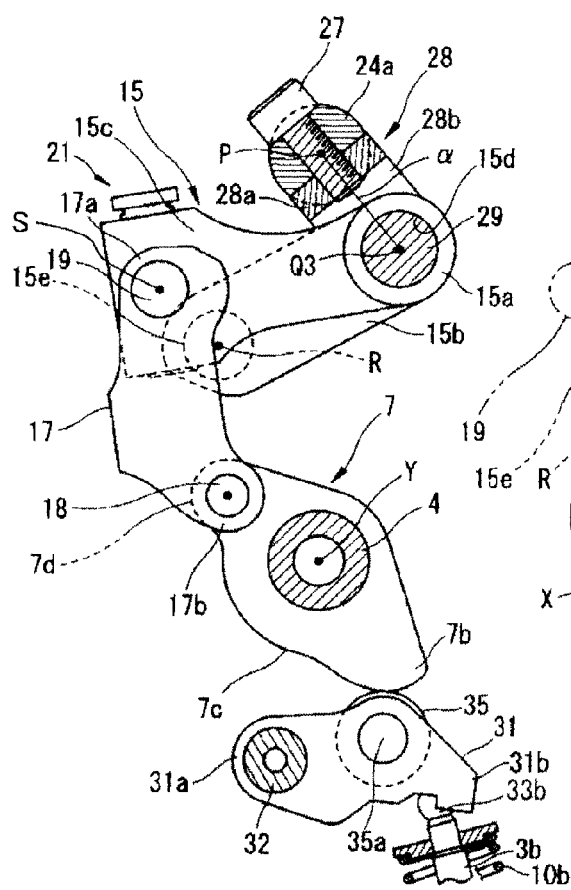
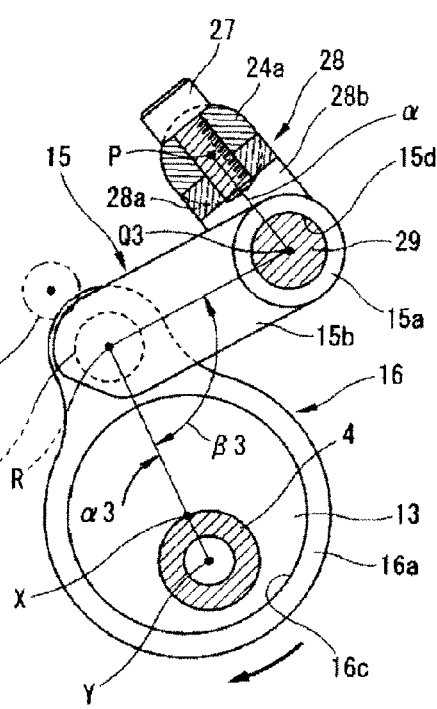
PEAK LIFT AMOUNT L3 (Sa)

MAXIMUM MECHANICAL
COMPRESSION RATIO CONTROL

MINIMUM MECHANICAL
COMPRESSION RATIO CONTROL

VALVE LIFT CHARACTERISTICS DURING WARM OPERATION

VARIABLE COMBUSTION SYSTEM FOR AN INTERNAL COMBUSTION ENGINE

TECHNICAL FIELD

The present invention relates to a variable combustion system for an internal combustion engine, which is configured to change a combustion form of a mixture in a combustion chamber, and more particularly, to a variable combustion system for an internal combustion engine, which is configured to change a combustion form by switching between compression self-ignition combustion and spark ignition combustion.

BACKGROUND ART

Hitherto, in a field of a gasoline-type internal combustion engine using gasoline as a fuel, spark ignition combustion for forcibly combusting a mixture by means of spark ignition by an ignition plug is generally adapted. However, in recent years, in place of the spark ignition combustion, research in employment of so-called compression self-ignition combustion in the gasoline-type internal combustion engine is in progress. The compression self-ignition combustion is combustion by self-ignition in a high-temperature and high-pressure environment generated by compressing a mixture by a piston.

The compression self-ignition combustion is such combustion that the mixture self-ignites at a plurality of positions simultaneously in the combustion chamber, and it is said that a combustion period is shorter and a higher heat efficiency is provided compared to the spark ignition combustion in which the combustion gradually extends through flame propagation. It should be noted that the compression self-ignition combustion is different from diffusion combustion in a diesel-type internal combustion engine using a diesel fuel, and is thus also referred to as homogeneous charge compression ignition (HCCI).

As a variable combustion system for an internal combustion engine, which is configured to simultaneously use the spark ignition combustion and the compression self-ignition combustion, for example, one described in Japanese Patent Application Laid-open No. 2013-227941 (Patent Document 1) is known. In the variable combustion system described in Japanese Patent Application Laid-open No. 2013-227941 (Patent Document 1), an internal combustion engine increased in a mechanical compression ratio (=geometrical compression ratio) up to approximately 18 is used to introduce an internal exhaust gas recirculation (EGR), to thereby realize compression self-ignition combustion excellent in fuel efficiency in a low load region. In a high load region in which the compression self-ignition combustion results in abnormal combustion, the combustion is switched to the spark ignition combustion, to thereby realize rapid combustion by carrying out high-pressure retard ignition for injecting a high-pressure fuel in a second half period in the compression stroke, and to suppress occurrence of knocking in the spark ignition combustion caused by the high mechanical compression ratio.

In Japanese Patent Application Laid-open No. 2013-227941 (Patent Document 1), the fuel is injected at a very high injection pressure as high as 30 MPa or more, and at a significantly retarded timing as late as the second half or later of the compression stroke (such as BTDC 20° to 0° CA). This injection at the high pressure and the retarded timing leads to reduction of an existing period of an unburnt mixture, and thus to avoidance of abnormal combustion.

CITATION LIST

Patent Literature

Patent Document 1: Japanese Patent Application Laid-open No. 2013-227941

SUMMARY OF INVENTION

However, when the above-mentioned high-pressure retarded injection is carried out in the high load region, a combustion speed becomes excessively high, and there is a fear of an excessive combustion noise although the knocking is suppressed. In addition, according to Japanese Patent Application Laid-open No. 2013-227941 (Patent Document 1), as a control method for the internal EGR, both exhaust valve open-twice control and opening control for a flow switch valve are used. However, a control precision and a control response of the internal EGR may not be sufficient, and there is such a fear that a combustion stability is not sufficiently obtained. Further, the high-pressure retarded injection is carried out in the second half of the compression stroke of the internal combustion engine at the high mechanical compression ratio, and hence a mechanical strength of a high-pressure fuel pump needs to be further increased. As a result, such secondary problems that a significant change in the high-pressure fuel pump is necessary, and a drive friction increases can occur.

The present invention has an object to solve at least one of the above-discussed problems.

The present invention has an object to provide a novel variable combustion system for an internal combustion engine, which can increase the combustion stability in the compression self-ignition combustion on the low load side, and/or can increase anti-knocking capability and the combustion stability in the spark ignition combustion on the high load side, and/or can further suppress the combustion noise concerned in the spark ignition combustion.

According to an aspect of the present invention, a variable valve actuating control mechanism (VVA) configured to control an internal EGR amount and a variable mechanical compression ratio control mechanism (VCR) configured to control a mechanical compression ratio are installed on an internal combustion engine are provided; in a first operating region in which the compression self-ignition combustion is carried out, mechanical compression ratio change control by the variable mechanical compression ratio control mechanism (VCR) is suppressed, and internal EGR amount change control by the variable valve actuating control mechanism (VVA) is carried out preferentially or on preferentially basis; and in a second operating region in which the spark ignition combustion is carried out, the internal EGR amount change control by the variable valve actuating control mechanism (VVA) is suppressed, and the mechanical compression ratio change control by the variable mechanical compression ratio control mechanism (VCR) is carried out preferentially or on preferentially basis.

BRIEF DESCRIPTION OF DRAWINGS

FIG. 6A is an explanatory diagram illustrating an operation for a large sub-lift control (non-lift) of the exhaust sub-lift control mechanism.

FIG. 6B is an explanatory diagram illustrating an operation for a large sub-lift control (peak lift) of the exhaust sub-lift control mechanism.

DESCRIPTION OF EMBODIMENTS

Now, a detailed description is given of embodiments of the present invention with reference to the drawings, but the present invention is not limited to the following embodiments, and includes various modifications and application examples in the scope thereof within a technical concept of the present invention.

First Embodiment

Before a description of specific embodiments of the present invention, a brief description is given of an overall configuration of a variable combustion system for an internal combustion engine to which the present invention is applied, a configuration of a variable valve actuating mechanism (VVA) including an exhaust sub-lift control mechanism and intake-side and exhaust-side valve timing control mechanisms, and a configuration of a variable mechanical compression ratio control mechanism (VCR).

Figure 1:
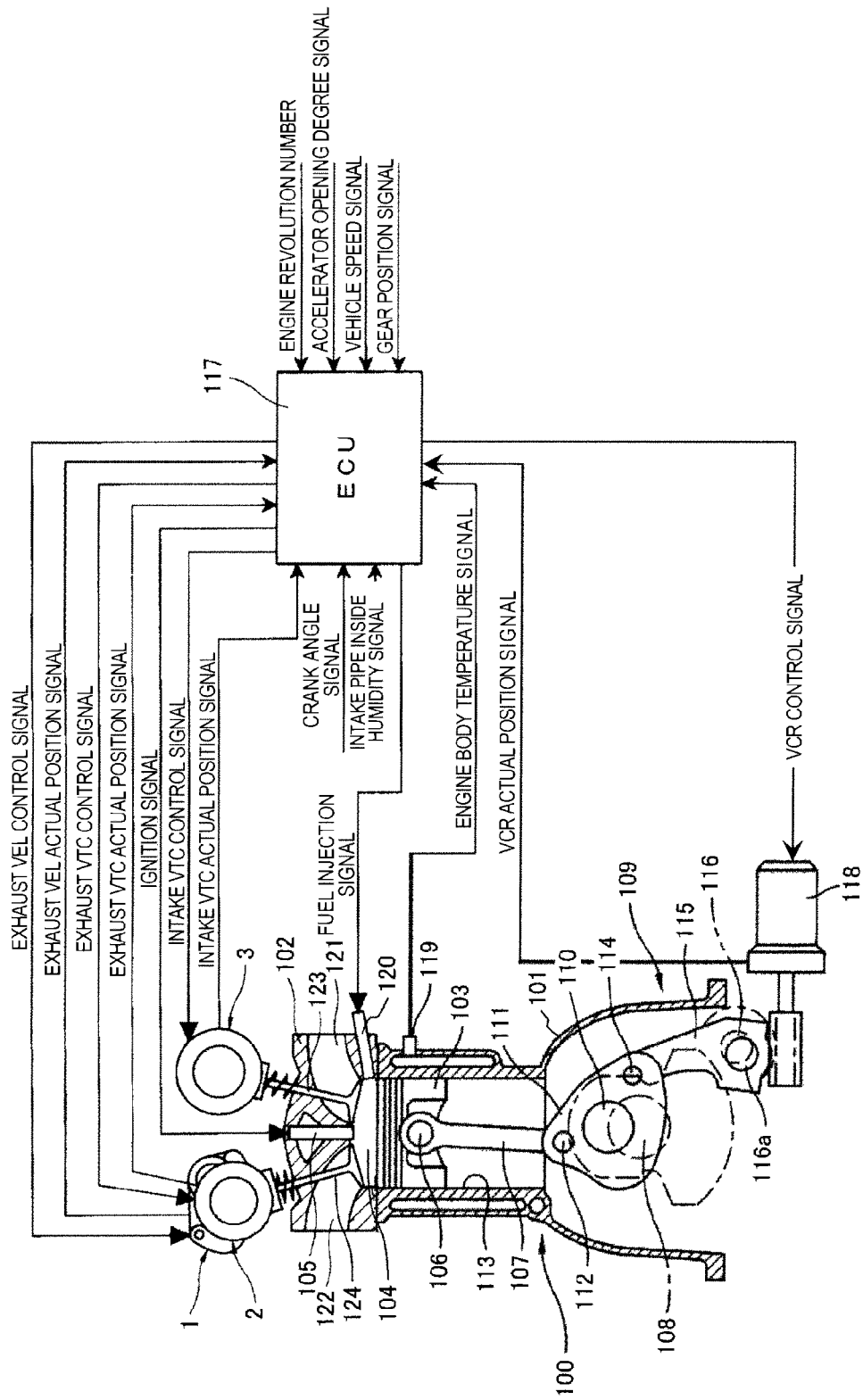
FIG. 1 is a configuration diagram of a variable combustion system for an internal combustion engine to which the present invention is applied.

In FIG. 1, a combustion chamber 104 is formed by a piston 103 between a cylinder block 101 and a cylinder head 102 of an internal combustion engine 100, and an ignition plug 105 is arranged approximately at a center position of the cylinder head 102. The piston 103 is connected to a crankshaft 108 via a connecting rod 107 having one end connected to a piston pin 106, and the crankshaft 108 is configured to be driven via a pinion gear mechanism by a starter motor so that a normal start when the engine is cold and an automatic start after an idle reduction are carried out. A variable mechanical compression ratio control mechanism (VCR) 109 capable of changing a mechanical compression ratio is arranged between the connecting rod 107 and the crankshaft 108.

The crankshaft 108 includes a plurality of journal parts and crankpins 110, and the journal parts are supported in a freely rotatable manner by main bearings of the cylinder block 101. The crankpin 110 is offset by a predetermined amount from the journal part, and a lower link 111 is coupled in a freely rotatable manner to the crankpin 110. The lower link 111 is configured to be divided into two members, which are left and right members, and the crankpin 110 is fitted in a freely rotatable manner into a coupling hole at approximately the center of the lower link 111.

An upper link 107 (having a function of a connecting rod) coupled via a coupling pin 112 to one end of the lower link 111 has an upper end coupled in a freely turnable manner to the piston 103 via the piston pin 106. The piston 103 receives a combustion pressure so as to reciprocate in a cylinder 113 of the cylinder block 101. Above the cylinder 113, intake valve(s) 123 and exhaust valve(s) 124 supported in the cylinder head 102 in a freely openable/closable manner are arranged. A control link 115 coupled to the other end of the lower link 111 via a coupling pin 114 has a lower end swingably coupled to a lower part of the cylinder block 101 via a control shaft 116. In other words, the control shaft 116 is supported by the cylinder block 101, and includes an eccentric cam 116a eccentric with respect to a rotational center thereof. The lower end of the control link 115 is coupled in a freely rotatable manner to the eccentric cam 116a.

A turn position of the control shaft 116 is controlled based on a control signal from a control device 117 as a controller, by a compression ratio control actuator 118 employing an electric motor. Thus, when the control shaft 116 is turned in one direction (counterclockwise direction) by the compression ratio control actuator 118, in the variable mechanical compression ratio control mechanism (VCR) 109, a center position of the eccentric cam 116a moves to a lower left position of FIG. 1. As a result, a swing support position at the lower end of the control link 115 changes, and, as a result, a stroke position of the piston 103 changes, resulting in a change to a control position maximum in the mechanical compression ratio, namely, a control position highest in the piston top dead center position.

On the other hand, when the control shaft 116 is turned toward the other direction (clockwise direction), the center position of the eccentric cam 116a moves to a vertically upward position in FIG. 1. As a result, the swing support position at the lower end of the control link 115 changes, and, as a result, the stroke position of the piston 103 changes, resulting in a change to a control position minimum in the mechanical compression ratio, namely, a control position lowest in the piston top dead center position. On this occasion, a stopper position (not shown) for restricting the maximum counterclockwise rotation of the control shaft 116 is only required to be set to the maximum control position, and a stopper position for restricting the maximum clockwise rotation is only required to be set to the minimum control position. On this occasion, the mechanical compression ratio $\epsilon$ is a value acquired by dividing a volume in the cylinder at the bottom dead center (BDC) of the piston 103 by the volume in the cylinder at the top dead center (TDC) of the piston 103. It should be noted that, as the variable mechanical compression ratio control mechanism (VCR) 109, for example, there is known one described in Japanese Patent Application Laid-open No. 2002-276446.

A water temperature sensor 119 for detecting a water temperature in a water jacket is mounted to the cylinder block 101, and an in-cylinder fuel injection valve 120 for injecting a fuel into the combustion chamber 104 is mounted on the cylinder head 102. Further, two intake valves 123 and two exhaust valves 124 for opening and closing intake ports 121 and exhaust ports 122 formed inside the cylinder head 102 are respectively mounted per cylinder in a freely slidable manner, and the variable valve actuating control mechanism (VVA) is arranged across the intake valve 123 side and the exhaust valve 124 side. An intake-side hydraulic valve timing control mechanism (I-VTC) 3 is arranged on the intake valve 123 side, and an exhaust-side variable valve actuating mechanism (E-VVA) including an exhaust sub-lift control mechanism (E-SVEL) 1 and an exhaust-side hydraulic valve timing control mechanism (E-VTC) 2 is arranged on the exhaust valve 124 side. It should be noted that, according to this embodiment, as the valve timing control mechanism, a mechanism of a hydraulic type is used, but the valve timing control mechanism may be an electric type using a motor, or a hybrid type using both the hydraulic type and the electric type.

A description is later given of specific configurations and operations of the variable mechanical compression ratio control mechanism (VCR) and the exhaust-side variable valve actuating mechanism (E-VVA). Then, the variable mechanical compression ratio control mechanism (VCR), the exhaust-side variable valve actuating mechanism (E-VVA), and the intake-side hydraulic valve timing control mechanism (I-VTC) 3 are operated by the control device 117. Illustrated sensor signals are input to the control device 117, and drive signals for respective control elements are output from the control device 117. The exhaust-side variable valve actuating mechanism (E-VVA) and the intake-side hydraulic valve timing control mechanism (I-VTC) as a whole are referred to as variable valve actuating control mechanism (VVA).

The exhaust-side variable valve actuating mechanism (E-VVA) includes the exhaust sub-lift control mechanism (E-SVEL) 1 for controlling a valve lift and an operation angle (open period) of the exhaust valves 124, and the exhaust-side hydraulic valve timing control mechanism (E-VTC) 2 for controlling an open/close timing (valve timing) of the exhaust valves 124. On this occasion, the exhaust sub-lift refers to control of opening the exhaust valves 124 by a predetermined amount also in the intake stroke, and controlling this open lift in addition to the open lift of the exhaust valves 124 that open or close in the exhaust stroke. The idea of the exhaust sub-lift control mechanism (E-SVEL) 1 is known in Japanese Patent Application Laid-open No. Hei 11-264319 and the like.

According to this embodiment, a reason for providing the exhaust sub-lift control mechanism (E-SVEL) 1 is that the exhaust valves 124 are opened in the intake stroke so as to re-introduce high-temperature combustion gas as an internal EGR into the combustion chamber 104 formed by the cylinder 113 and the piston 103. Then, stable compression self-ignition combustion excellent in the fuel efficiency is realized by using this exhaust sub-lift control mechanism (E-SVEL) 1 to appropriately control the exhaust sub-lift characteristic. It should be noted that, an object of the present invention is to appropriately control the internal EGR so as to increase the combustion stability of the compression self-ignition combustion, and thus the present invention is not limited to the specific configuration of the exhaust sub-lift control mechanism (E-SVEL) 1, and can use various internal EGR control mechanisms. Moreover, as illustrated in FIG. 1, according to this embodiment, the variable mechanical compression ratio control mechanism (VCR) for changing the mechanical compression ratio (=geometrical compression ratio) is also installed, and anti-knocking capability is increased and a combustion noise is reduced in the spark ignition combustion by the control of this mechanical compression ratio.

According to this embodiment, through the combination of the variable valve actuating control mechanism (VVA) and the variable mechanical compression ratio control mechanism (VCR), the combustion stability is increased in the compression self-ignition combustion on a low load side. Simultaneously, in the spark ignition combustion on a high load side, the anti-knocking capability and the combustion stability are increased. Further, the combustion noise in the spark ignition combustion is suppressed.

Figure 2:
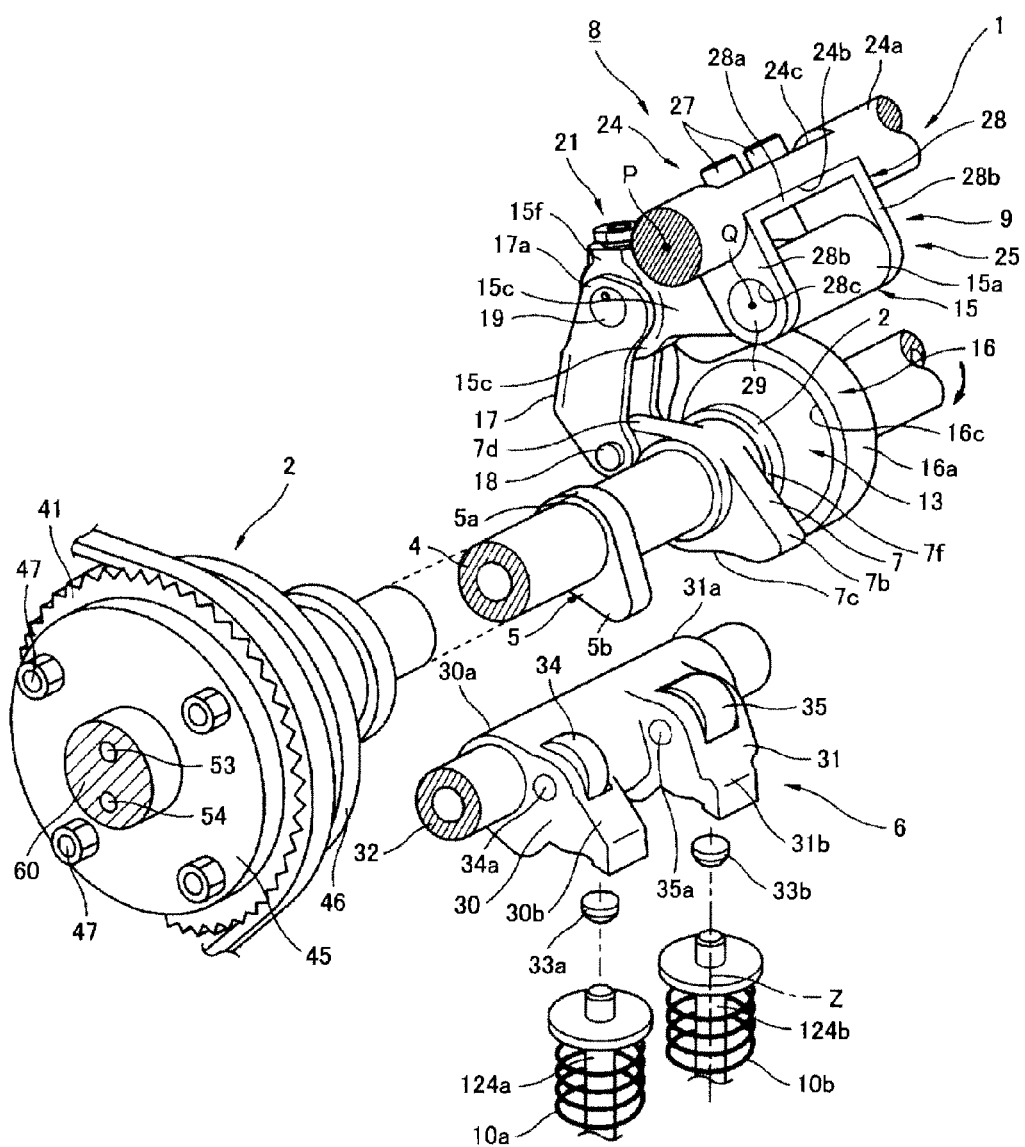
FIG. 2 is a perspective view of an exhaust-side variable valve actuating mechanism (E-VVA) illustrated in FIG. 1.
Figure 3:
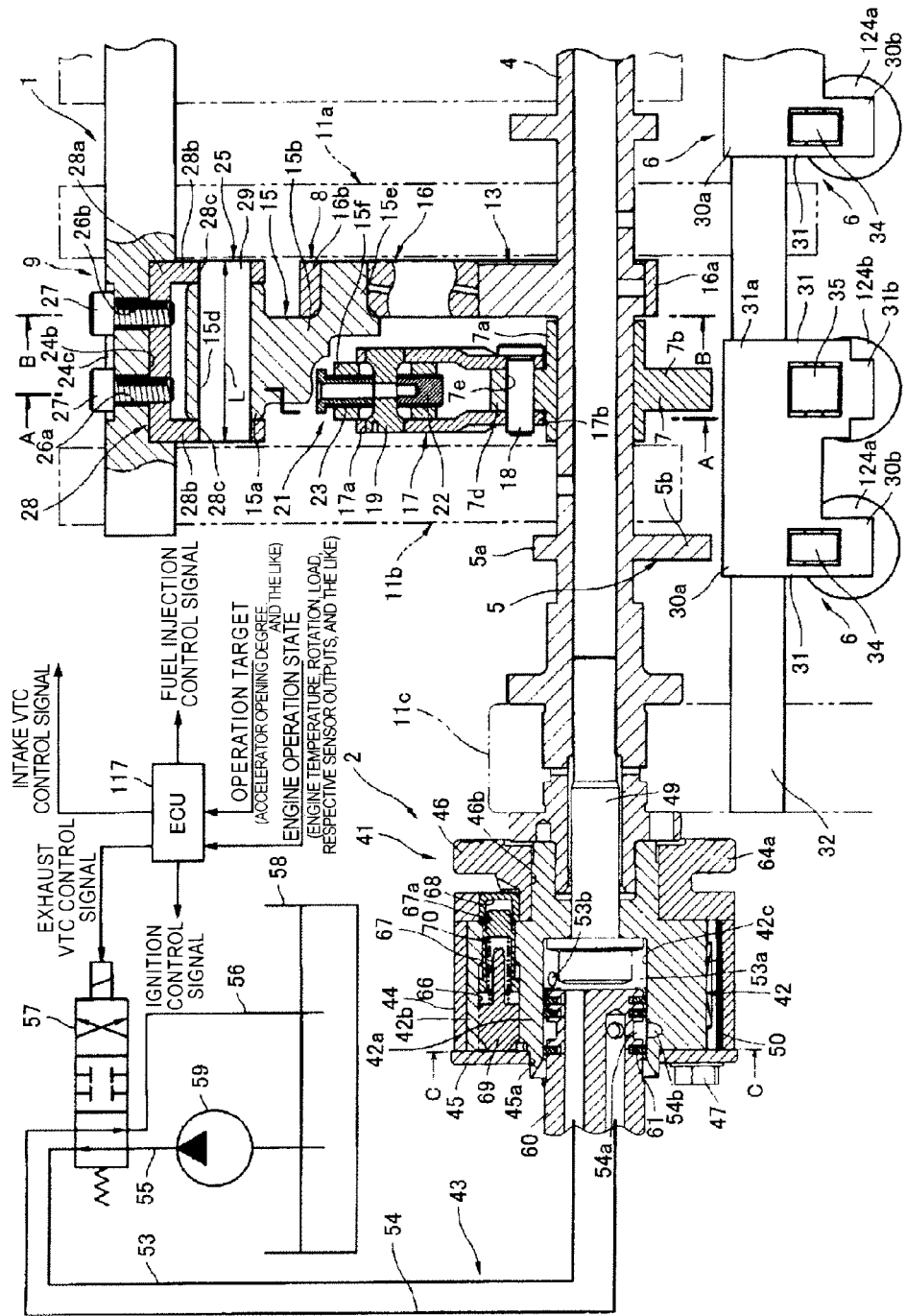
FIG. 3 is a cross sectional view illustrating a configuration of the exhaust-side variable valve actuating mechanism illustrated in FIG. 2.
Figure 4A:
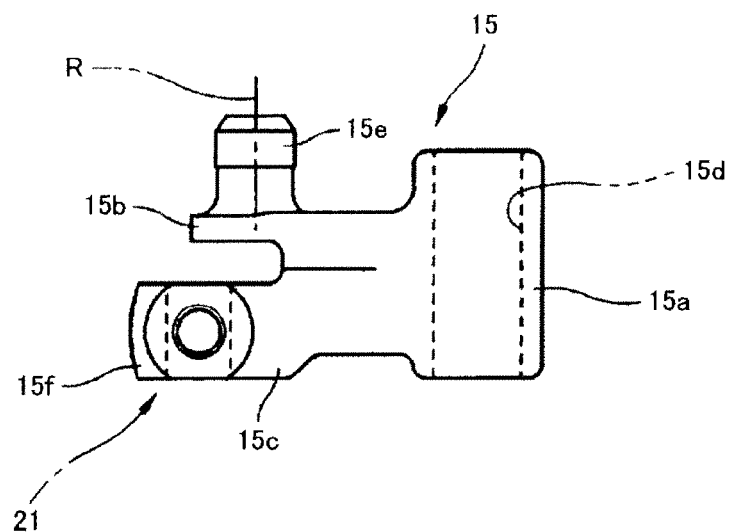
FIG. 4A is a top view of a rocker arm of an exhaust sub-lift control mechanism constructing the exhaust-side variable valve actuating mechanism (E-VVA).
Figure 4B:
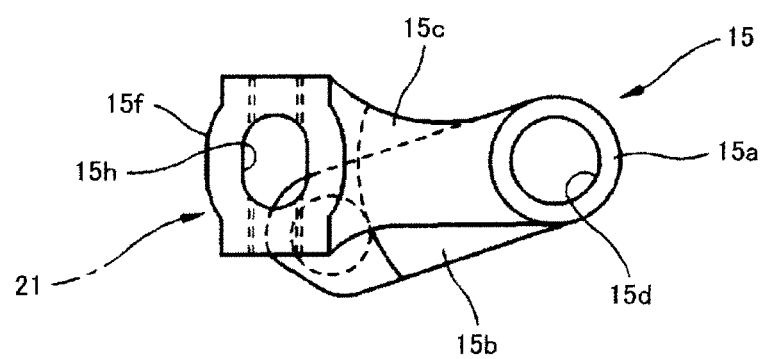
FIG. 4B is a front view of the rocker arm of the exhaust sub-lift control mechanism illustrated in FIG. 4A.

A brief description is now given of the specific configuration and the operation of the exhaust-side variable valve actuating mechanism (E-VVA). As illustrated in FIGS. 2 and 3, the exhaust-side variable valve actuating mechanism (E-VVA) according to this embodiment includes first and second exhaust valves 124a and 124b mounted in pair (two) per cylinder on the cylinder head 102 in freely slidable manner via valve guides (not shown), for opening and closing two exhaust ports, a hollow drive shaft 4 arranged in a longitudinal direction of the engine, a single swing mechanism 6 arranged on upper ends of the respective exhaust valves 124a and 124b, a rotation cam 5, which is an exhaust main lift cam, formed integrally with an outer periphery of the drive shaft 4 for opening and closing the first and second exhaust valves 124a and 124b via the swing mechanism 6, a swing cam 7, which is an exhaust sub-lift cam, supported in a freely rotatable manner on the outer periphery of the drive shaft 4, for similarly opening and closing the first and second exhaust valves 124a and 124b via the swing mechanism 6, a drive cam 13 (described later) integrally formed on the outer periphery of the drive shaft 4, a transmission mechanism 8 for associating the drive cam 13 and the swing cam 7 with each other so as to convert a rotational force of the drive cam 13 into a swing operation, and to transmit the swing operation to the swing cam 7 as a swing force, a control mechanism 9 for changing an attitude of the transmission mechanism 8 so as to continuously variably control the valve lift amount and the operation angle of the exhaust sub-lift characteristic of the first and second exhaust valves 124a and 124b depending on an engine operation state, and the hydraulic valve timing control mechanism (E-VTC) 2 arranged on one end (front end) of the drive shaft 4, and serving as an exhaust sub-lift phase variable mechanism for variably controlling a valve timing (peak lift phase) of the exhaust sub-lift of both the first and second exhaust valves 124a and 124b.

The operation angle of the first and second exhaust valves 124a and 124b refers to a period in which the first and second exhaust valves 124a and 124b are open. Moreover, the swing cam 7, the transmission mechanism 8, and the control mechanism 9 construct the exhaust sub-lift control mechanism (E-SVEL) 1, and one set of these components of the exhaust sub-lift control mechanism (E-SVEL) 1 is provided for each cylinder.

The first and second exhaust valves 124a and 124b are biased in a direction of closing open ends of the respective exhaust ports by valve springs 10a and 10b each elastically installed between a bottom of an approximately cylindrical bore formed through an upper, end of the cylinder head 102 and a spring retainer at an upper end of a valve stem. Then, the first and second exhaust valves 124a and 124b open in the exhaust stroke based on an exhaust main lift characteristic, and open in the intake stroke based on the exhaust sub-lift characteristic.

Both ends and predetermined axial parts of the drive shaft 4 are arranged above the cylinder head 1, and are supported in a freely rotatable manner by two first and second bearing parts 11a and 11b for each cylinder, which are arranged on both side parts of a component member of the exhaust sub-lift control mechanism (E-SVEL) 1, and by a bearing part 11c on an end side. Moreover, an oil passage is axially formed in the drive shaft 4. Thus, the drive shaft 4 is configured to supply lubricant flowing through the oil passage to the respective bearing parts 11a to 11c. Further, one drive cam 13 for one cylinder is fixed or integrally formed at a predetermined axial position of the outer periphery of the drive shaft 4.

A rotational force is transmitted from the crankshaft of the engine to the drive shaft 4 via the exhaust-side hydraulic valve timing control mechanism (E-VTC) 2, which is mounted on one end of the drive shaft 4 and on which a timing chain (or timing belt) is wound. As a result, the drive shaft 4 rotates in a clockwise direction (direction of the arrow) of FIG. 2.

The drive cam 13 is formed into an approximately disk shape. An outer periphery of the drive cam 13 is formed into a cam profile of an eccentric circle, and an axial center X thereof is radially offset by a predetermined amount from an axial center Y of the drive shaft 4. As also illustrated in FIGS. 2 and 3, the rotation cam 5 is integrally formed on the outer peripheral surface of the drive shaft 4, and an outer peripheral surface 5a thereof is configured as a so-called egg shape cam surface. The rotation cam 5 rotates in synchronous with the drive shaft 4 so as to use a base circle part and a cam nose part 5b of the outer peripheral surface 5a to open and close the first and second exhaust valves 124a and 124b via the swing mechanism 6.

As illustrated in FIG. 2, the swing mechanism 6 integrally includes a first swing arm 30, a second swing arm 31 arranged axially next to a side of the first swing arm 30, and a coupling part for coupling both of them to each other. Both of these swing arms 30 and 31 integrally operate with each other, and are supported in a freely swingable manner by a single rocker shaft 32 on a base end 30a side and a base end 31a side, respectively. A circular recess is formed on a lower surface of each of tips 30b and 31b protruding in the same direction. The swing arms 30 and 31 respectively abut, via disk-shaped shims 33a and 33b fitted into the respective recesses, against stem end upper top surfaces of the first and second exhaust valves 124a and 124b.

The first swing arm 30 is arranged at the same position as the rotation cam 5 in the axial direction of the rocker shaft 32. A main roller 34 rolling in contact with the outer peripheral surface 5a of the rotation cam 5 is mounted approximately at the center of a width range in the axial direction of the rocker shaft 32. An axial center of the valve stem of the first exhaust valve 124a is arranged at the approximately center in the widthwise direction of the main roller 34. Moreover, the main roller 34 is received and arranged in a freely rotatable manner via a roller shaft 34a in a recessed groove formed approximately at a center in the widthwise direction of the first swing arm 30, and an upper end of the main roller 34 is always exposed on the rotation cam 5 side.

The second swing arm 31 is arranged so as to be axially offset with respect to the first swing arm 30. The swing force is directly transmitted from the swing cam 7 to the second swing arm 31. Moreover, a spherical lower surface of the shim 33b fitted into the tip 31b abuts against an upper surface of the stem end of the second exhaust valve 124b. The swing force of the swing cam 7 presses and opens the second exhaust valve 124b against a spring force of the valve spring 10b, and also opens the first exhaust valve 124a via the first swing arm 30 integrally formed with the second swing arm 31 and the shim 33a.

Moreover, on the second swing arm 31, a sub-roller 35 rolling in contact with a cam surface 7c of the swing cam 7 is mounted approximately at a center position in the widthwise direction, and an approximately center position in the widthwise direction of this sub-roller 35 matches with the axial center position of the valve stem of the second exhaust valve 124b. It should be noted that the sub-roller 35 is received and arranged in a freely rotatable manner via a roller shaft 35a in a recessed groove formed approximately at a center of the second swing arm 31, and an upper end of the sub-roller 35 is always exposed on the swing cam 7 side.

The lower surface of each of the shims 33a and 33b, which is brought into abutment against each of the exhaust valves 124a and 124b, is formed into an approximately spherical shape. As a result, when the respective first and second swing arms 30 and 31 swing, the vicinities of the centers of the stem ends of the respective exhaust valves 124a and 124b are pressed.

As illustrated in FIGS. 2, 3, 5A, and 5B, the swing cam 7 has an approximately raindrop shape, and is integrally formed with a cam shaft 7a in a short cylindrical shape, which is formed on a base end side so as to be fitted on the outer peripheral surface of the drive shaft 4. The swing cam 7 is supported via the cam shaft 7a in a freely swingable manner about the axial center Y of the drive shaft 4. Moreover, in the swing cam 7, the cam surface 7c is formed on a lower surface between the base end and the cam nose part 7b on the tip side. On this cam surface 7c, a base circle surface on the base end side, a ramp surface extending in an arc shape from the base circle surface to the cam nose part 7b side, and a lift surface extending from the ramp surface to a top surface for the maximum lift on the tip side of the cam nose part 7b are formed. Moreover, the cam surface 7c abuts against an outer peripheral surface of the sub-roller 35 of the second swing arm 31, and a position abutting against the sub-roller 35 displaces depending on a swing position of the swing cam 7 so as to change the valve lift amount and the operation angle of the first and second exhaust valves 124a and 124b.

Further, on the swing cam 7, a swing direction in which the abutment point on the cam surface 7c with the sub-roller 35 moves toward the lift surface side so as to open the first and second exhaust valves 124a and 124b is set to be the same as the rotation direction (arrow direction) of the drive shaft 4. Thus, a friction coefficient between the drive shaft 4 and the swing cam 7 generates a drag torque in a direction of the lift of the swing cam 7. Therefore, a drive efficiency of the swing cam 7 increases. On the swing cam 7, a coupling part 7d is integrally protruded at a position on an opposite side to the cam nose part 7b across the cam shaft 7a, and a pin hole 7e through which a coupling pin 18 for coupling to the other end of a link rod 17 described later is inserted is formed toward both side surfaces through the coupling part 7d. Then, the variable maximum cam lift amount of the swing cam 7 is set to be smaller than the fixed maximum cam lift amount of the rotation cam 5.

As illustrated in FIGS. 2 to 4B, the transmission mechanism 8 is constructed as a mechanical articulated link mechanism by a rocker arm 15 arranged along a widthwise direction of the engine above the drive shaft 4, a link arm 16 for associating the rocker arm 15 and the drive cam 13 with each other, and the link rod 17 for associating the rocker arm 15 and the coupling part 7d of the swing arm 7 with each other. As illustrated in FIGS. 2, 3, 4A, and 4B, the rocker arm 15 includes a tubular base part 15a arranged on one side and supported in a freely swingable manner by a control eccentric shaft 29 described later, and first and second arm parts 15b and 15c protruding approximately in parallel in a fork shape toward an outside (side direction) of the engine from the outer surface of the tubular base part 15a. A support hole 15d for fitting onto and supporting an outer periphery of the control eccentric shaft 29 described later with a minute gap is formed through the tubular base part 15a. On the first arm part 15b, a shaft part 15e with which a protruding end 16b of the link arm 16 described later is associated in a freely rotatable manner is integrally protruded on an outer surface of a tip.

On the other hand, on the second arm part 15c, a lift adjustment mechanism 21 is mounted on a block part 15f at a tip, and one end 17a of the link rod 17 is freely rotationally associated with a pivot pin 19 (described later) of the lift adjustment mechanism 21. Moreover, a long hole 15h for a vertical motion of the pivot pin 19 is laterally formed through both sides of the block part 15f. The first arm part 15b and the second arm part 15c are arranged at angles different from each other in the swing direction in a vertically displaced state, and the tip of the first arm 15b is inclined downward at a slight inclination angle with respect to the tip of the second arm 15c.

As illustrated in FIGS. 2, 3, 5A, and 5B, the link arm 16 includes an annular part 16a relatively large in the radius, and the protruding end 16b protruding from a predetermined position in an outer peripheral surface of the annular part 16a. A fit hole 16c for fitting onto and supporting an outer peripheral surface of a cam body of the drive cam 13 in a freely rotatable manner is formed at a center position of the annular part 16a. The link rod 17 is formed by pressing so as to have an approximately U shape in a lateral cross section, and the inner side thereof is bent and formed into an approximately arc shape in order to reduce the size. On the link rod 17, the one end 17a is coupled to the second arm part 15c via the pivot pin 19 inserted through the pin hole, and the other end 17b is coupled in a freely rotatable manner to the coupling part 7d of the swing cam 7 via the coupling pin 18 inserted through the pin hole. Moreover, only one link rod 17 is mounted for one cylinder (two exhaust valves). Thus, the structure is simplified, and the weight is reduced. The swing cam 7 lifts while swinging as a result of pulling up of the coupling part 7d at the rear end by the link rod 17. However, the cam nose part 7b, which receives the input from the sub-roller 35, is arranged on the opposite side to the coupling part 7d across the swing center. Thus, a fall of the swing cam 7 can be suppressed.

As illustrated in FIGS. 2 and 3, the lift adjustment mechanism 21 includes the pivot pin 19 arranged in the long hole 15h of the block part 15f of the second arm 15c of the rocker arm 15, an adjustment bolt 22 for threadedly engaging from below with an adjustment female thread hole drilled toward the long hole in a lower section of the block part 15f, and a lock bolt 23 for threadedly engaging from above with a fixing female thread hole drilled toward the long hole in an upper section of the block part 15f. Then, after assembly of the respective components, the lift amount of the respective exhaust valves 124a and 124b is finely adjusted by using the adjustment bolt 22 to adjust a vertical position of the pivot pin 19 in the long hole 15h. When the adjustment operation is finished, the lock bolt 23 is tightened so as to fix the position of the pivot pin 19.

The control mechanism 9 includes a control shaft 24 arranged in parallel with the drive shaft 4 at a position above the drive shaft 4, and an electric actuator (not shown) for rotationally driving the control shaft 24. As illustrated in FIGS. 2 and 3, the control shaft 24 includes a control spindle 24a, and a plurality of control eccentric cams 25 (control eccentric shafts 29) provided for one cylinder on an outer periphery of the control spindle 24a, and serving as swing fulcrums of the rocker arm 15. On the control spindle 24a, recesses 24b and 24c in a-width-across-flat form are formed at positions corresponding to the rocker arm 15, and two bolt insertion holes 26a and 26b are formed through the control spindle 24a along the radial direction at a predetermined axial interval between both the recesses 24b and 24c. The respective recesses 24b and 24c extend in and axial direction of the control spindle 24a, and a bottom surface of each of the recesses 24b and 24c is formed into a flat surface.

The control eccentric cam 25 includes a bracket 28 fixed to the one recess 24b through two bolts 27 and 27 inserted through the bolt insertion holes 26a and 26a from the other recess 24c side, and the control eccentric shaft 29 fixed to a tip side of the bracket 28. The bracket 28 is formed so that a side surface is bent into an approximately U shape, and includes a rectangular base part 28a extended in a lengthwise direction of the one recess 24b, and fitted into and held by the one recess 24b, and fixing pieces 28b and 28b in arm shapes protruding downward of FIG. 3 on both ends in the lengthwise direction of the base part 28a. Female thread holes with which tips of the bolts 27 and 27 are threadedly engaged are formed through the base part 28a on both end sides in the lengthwise direction, and fixing holes 28c and 28c for fixing the control eccentric shaft 20 are formed through both the fixing pieces 28b and 28b on tip sides. Moreover, an outer surface of the base part 28a of the bracket 28 is arranged in abutment against a bottom surface of the one recess 24b, and outer end edges of both of the fixing pieces 28b and 28b are in close contact with, and are fitted into and held by opposing inner surfaces of the one recess 24b, resulting in a high positioning precision in the lengthwise direction.

The outer peripheral surface of the control eccentric shaft 29 supports, in a freely swingable manner, the rocker arm 15 via the support hole 15d of the tubular base part 15a of the rocker arm 15. An axial length L of the control eccentric shaft 29 is set to be approximately the same as a distance between the outer surfaces of both the support pieces 28b and 28b of the bracket 28, and both ends of the control eccentric shaft 29 are fixed by press-fitting the both ends into the respective fixing holes 28c and 28c. An axial center Q of the control eccentric shaft 29 is configured as a swing fulcrum of the rocker arm 15. Then, a region from the outer surface of the cam body of the drive cam 13 to the outer surface of the link rod 17 including the swing cam 7 is arranged within the length L of the control eccentric shaft 29.

Figure 5A:
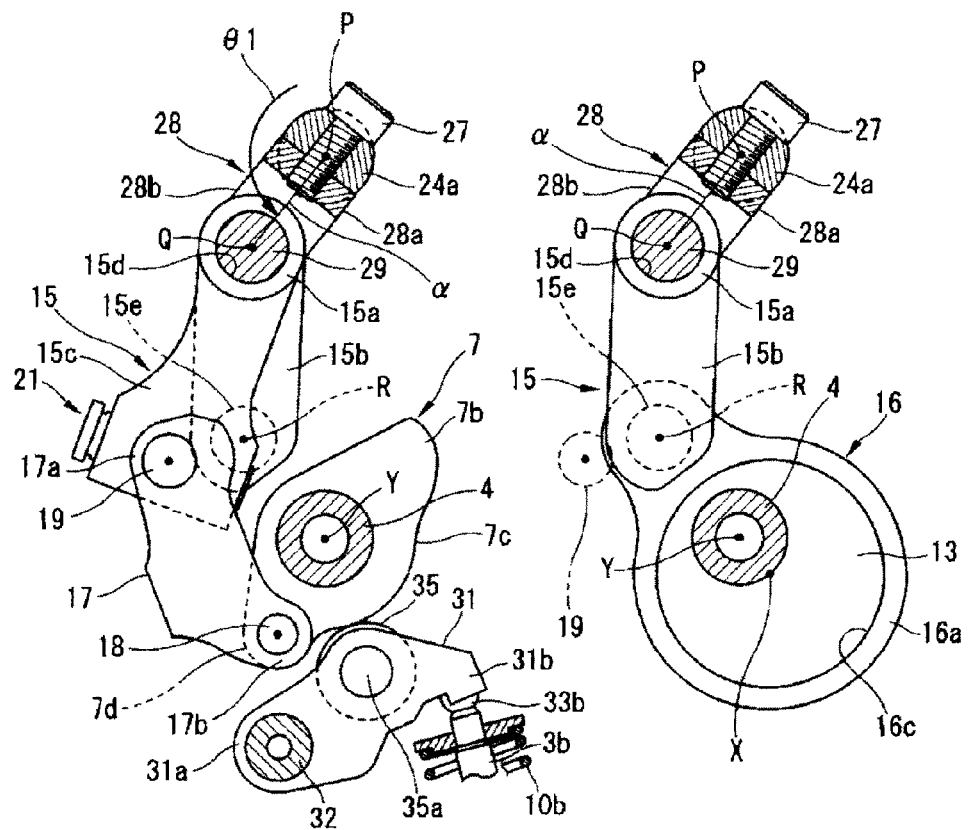
FIG. 5A is an explanatory diagram illustrating an operation for a small sub-lift control (non-lift) of the exhaust sub-lift control mechanism.

Moreover, as illustrated in FIG. 5A, the axial center Q of the control eccentric shaft 29 is eccentric by a relatively large eccentric amount a from the axial center P of the control spindle 24a by a length of arms of both the support pieces 28b and 28b of the bracket 28. In other words, the control eccentric shaft 29 is formed into a crank shape via the bracket 28 with respect to the axial center P of the control spindle 24a, and the sufficiently large eccentric amount a can thus be secured. As a result, as described later, as the lift (operation angle) increases, such a characteristic as to retard a peak lift phase is presented.

The electric actuator mainly includes an electric motor (not shown) fixed to a rear end of the cylinder head 102, and a speed reducer such as spur gears for transmitting a rotational drive force of the electric motor to the control spindle 24a. The electric motor is constructed by a DC motor of the proportional type, and is driven by a control signal output by the control device 117 for detecting an operation state of the engine. The control device 117 detects a current engine operation state through calculation based on a crank angle sensor for detecting the number of engine revolutions, an airflow meter for detecting an intake air amount, a water temperature sensor for detecting a water temperature of the engine, and the like. In addition, the control device 117 inputs information signals from a potentiometer for detecting a rotational position of the control shaft 24 and the like so as to detect an operation position of the exhaust sub-lift control mechanism (E-SVEL) 1, to thereby feedback control the electric motor. In this electric actuator, electricity, not a hydraulic pressure, is used, and a quick switching response independent of an oil temperature and the number of revolutions of the engine is expected.

The valve lift amount and the operation angle of the first and second exhaust valves 124a and 124b are continuously controlled from the minimum operation angle (minimum lift amount) to the maximum operation angle (maximum lift amount) by using the electric actuator to control a rotational position of the control spindle 24a depending on the engine operation state. Moreover, upon a change in the operation angle, while a change in the open timing of the valve lift characteristic is suppressed, the close timing can be greatly changed by the above-mentioned large eccentric amount a and identification of positional relationships among the axial center P of the control spindle 24a, the axial center R of the protruded shaft 15e of the rocker arm 15, and the axial center S of the pivot pin 19 depending on the rotational position of the control spindle 24a.

A description is now given of the open/close operation of the first and second exhaust valves 124a and 124b. In the exhaust stroke during the operation of the engine, as the rotation cam 5 rotates, the main roller 34 is pushed down, the first and second exhaust valves 124a and 124b are opened or closed depending on an exhaust main lift characteristic, namely, a cam profile of the rotation cam 5 so as to open or close the respective exhaust ports depending on the exhaust main lift characteristic. On the other hand, in the intake stroke, the swing cam 7 of the exhaust sub-lift control mechanism (E-SVEL) 1 pushes down the sub-roller 35, and the first and second exhaust valves 124a and 124b are opened or closed depending on an exhaust sub-lift characteristic, namely, a cam profile of the swing cam 7, so as to open or close the respective exhaust ports depending on the exhaust sub-lift characteristic.

Then, when the rotational phase of the control shaft 24 of the exhaust sub-lift control mechanism (E-SVEL) 1 is changed, for example, counterclockwise in FIG. 2 to $\theta 1$ to $\theta 3$, as illustrated in FIGS. 5A, 5B, 6A, and 6B, the exhaust sub-lift characteristic changes from a peak lift amount L1 (corresponding to Sb described later) to a peak lift amount L3 (corresponding to Sa described later). It should be noted that control to an intermediate peak lift amount in the course is possible, and, for example, the exhaust sub-lift characteristic continuously changes through a peak lift amount L2 to the peak lift amount L3. Moreover, when the rotational phase is controlled to attain $\theta 0$ smaller than $\theta 1$, a zero lift (corresponding to Sc, Sd, and Scd described later) can be achieved. It should be noted that $\alpha$ of the diagram is the eccentricity amount of the eccentric control cam 25.

Figure 5B:
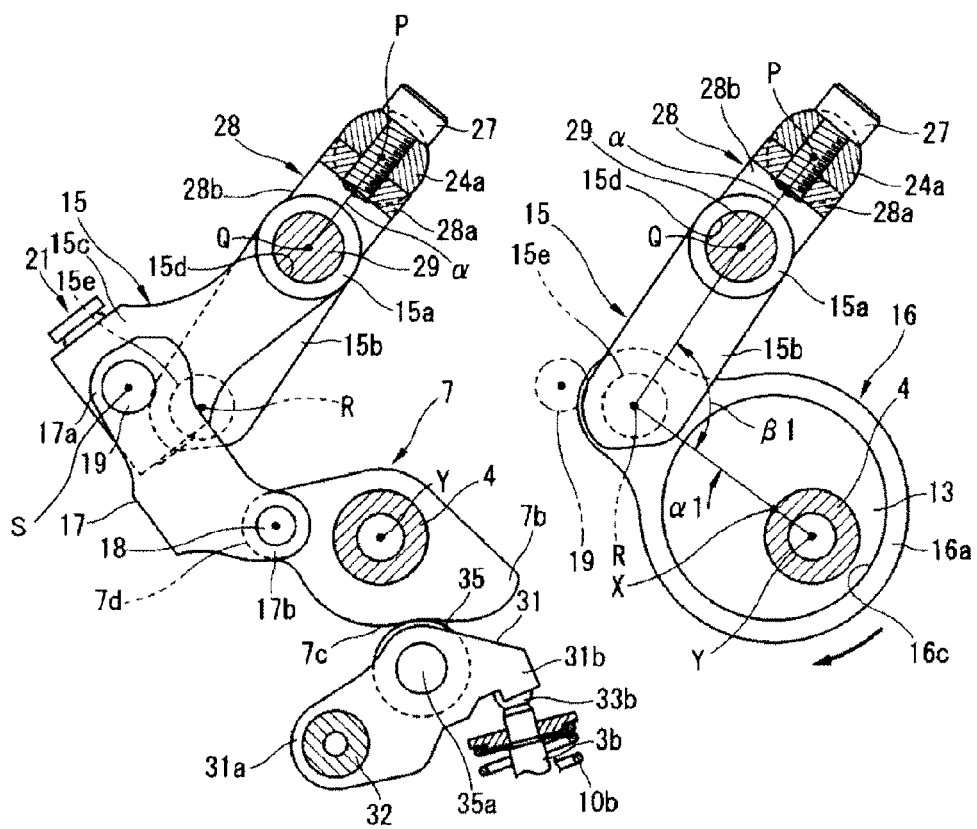
FIG. 5B is an explanatory diagram illustrating an operation for a small sub-lift control (peak lift) of the exhaust sub-lift control mechanism.

Referring to FIGS. 5A, 5B, 6A, and 6B, a brief description is now given of an operation of the exhaust sub-lift control mechanism (E-SVEL) 1. FIGS. 5A and 5B illustrate a state in which the exhaust valves 124a and 124b are controlled to attain the small lift amount L1 (Sb). FIG. 5A illustrates a non-lift timing when the exhaust valves 124a and 124b are closed, and FIG. 5B illustrates a peak lift timing when the exhaust valves 124a and 124b are opened. Moreover, FIGS. 6A and 6B illustrate a state in which the exhaust valves 124a and 124b are controlled to attain the maximum lift amount L3 (Sa). FIG. 6A illustrates the non-lift timing when the exhaust valves 124a and 124b are closed, and FIG. 6B illustrates the peak lift timing when the exhaust valves 124a and 124b are opened. On this occasion, a cross section (A) in FIGS. 5A, 5B, 6A, and 6B corresponds to a cross section taken along the line A-A of FIG. 3, and a cross section (B) corresponds to a cross section taken along the line B-B of FIG. 3.

Although a specific operation of the exhaust sub-lift control mechanism (E-SVEL) 1 according to this embodiment is described later, the following control can be provided as an operation example of the exhaust sub-lift control mechanism (E-SVEL) 1.

For a predetermined load (spark ignition region) when the internal combustion engine has not been warmed up immediately after the engine start, a control signal is output from the control device 117 to the electric motor, and, as illustrated in FIGS. 5A and 5B, the control spindle 24a is rotationally driven via the speed reducer to, for example, the counterclockwise position $\theta 1$. Thus, the control eccentric shaft 29 reaches the same position of $\theta 1$, and the axial center Q moves toward the upper left direction so as to separate from the drive shaft 4. As a result, the entire transmission mechanism 8 tilts counterclockwise about the drive shaft 4. As a result, the swing cam 7 also turns counterclockwise, and the abutment position with the sub-roller 35 of the second swing arm 31 becomes close to the base circle part of the cam surface 7c. Thus, when the rocker arm 15 is pushed up via the link arm 16 as the drive cam 13 rotates from the closed state illustrated in FIG. 5A, as illustrated in FIG. 5B, the coupling part 7d of the swing cam 7 is lifted up via the link rod 17, so as to clockwise rotate the swing cam 7. This lift lifts, via the sub-roller 35 of the second swing arm 31 of the swing mechanism 6, the first and second exhaust valves 3*a* and 3*b* to open, but the lift amount and the operation angle are sufficiently small (lift amount L1).

Alternatively, for a predetermined load (compression ignition region) when the internal combustion engine has been warmed up, a control signal is output from the control device 117 to the electric motor, and, as illustrated in FIGS. 6A and 6B, the control spindle 24*a* further rotates counterclockwise via the speed reducer to, for example, the position θ3. Thus, the control eccentric shaft 29 reaches the same position of θ3, and the axial center Q moves toward the upper right direction so as to separate from the drive shaft 4. As a result, the entire transmission mechanism 8 tilts clockwise about the drive shaft 4. As a result, the swing cam 7 also turns clockwise, and the abutment position with the sub-roller 35 of the second swing arm 31 becomes close to the lift part of the cam surface 7*c*. As a result, the lift amount of the exhaust valves 124*a* and 124*b* reaches the maximum peak lift L3, and the operation angle reaches the maximum operation angle.

On this occasion, an attitude of the link arm 16 upon the peak lift is considered. When the control is provided so as to attain the lift L1, as illustrated in FIG. 5B, the attitude is at an angle α1. When the control lift is increased to the maximum peak lift L3, the attitude of the link arm rises counterclockwise to α3. This represents such a characteristic that the peak lift phase retards as the control lift (control operation angle) increases. In other words, the peak lift phase retards as the control operation angle increases. Thus, such a characteristic that the advance change of the open timing is suppressed, and the close timing can be greatly retarded in the lift characteristic is obtained.

As illustrated in FIGS. 2, 3, 7A, and 7B, the exhaust-side hydraulic valve timing control mechanism (E-VTC) 2 is of a vane type, and includes a timing sprocket 41 for transmitting the rotational force to the drive shaft 4, a vane member 42 fixed to an end of the drive shaft 4 and received in a freely rotatable manner in the timing sprocket 41, and a hydraulic circuit 43 for forward/backward rotating the vane member 42 by means of a hydraulic pressure.

The timing sprocket 41 includes a housing 44 for receiving the vane member 42 in a freely rotatable manner, a front cover 45 in a circular plate shape for closing a front end opening of the housing 44, and a rear cover 46 approximately in a circular plate shape for closing a rear end opening of the housing 44. These housing 44, front cover 45, and rear cover 46 are tightened together and integrally fixed in the axial direction of the drive shaft 4 by four small-diameter bolts 47.

The housing 44 has a cylindrical shape having openings formed at both the front and rear ends, and four shoes 44*a* are formed so as to protrude inward at positions separated from each other by approximately 90° in a peripheral direction of an inner peripheral surface. Each of the shoes 44*a* has approximately a trapezoidal shape in a lateral cross section. Four bolt insertion holes into each of which a shank of each of the bolts 47 is inserted are formed so as to axially pass through the shoes 44*a* approximately at the center positions. Further, a seal member 48 in a U shape and a plate spring (not shown) for inwardly pressing the seal member 48 are fitted into and held in a holding groove formed by cutting each inner end surface of the shoe 44*a* along the axial direction at a high part position. The front cover 45 is formed into a disk plate shape. A support hole 45*a* relatively large in diameter is drilled at the center of the front cover 45, and four bolt holes (not shown) are drilled through an outer periphery at positions corresponding to the respective bolt insertion holes of the housing 44. In the rear cover 46, a gear part 46*a* meshing with the timing chain is integrally formed on a rear end side, and a bearing hole 46*b* large in the diameter is formed so as to axially pass through the rear cover 46 approximately at the center.

The vane member 42 includes a vane rotor 42*a* in an annular shape having a bolt insertion hole at the center, and four vanes 42*b* integrally formed at positions separated by approximately 90° in a peripheral direction of an outer peripheral surface of the vane rotor 42*a*. A small diameter tube part on the front end side of the vane rotor 42*a* is supported in a freely rotatable manner by the support hole 45*a* of the front cover 45, and a small diameter cylindrical part on the rear end side of the vane rotor 42*a* is supported in a freely rotatable manner by the bearing hole 46*b* of the rear cover 46. Moreover, the vane member 42 is axially fixed to the front end of the drive shaft 4 by a fixing bolt 49 axially inserted through the bolt insertion hole of the vane rotor 42*a*. Three of the vanes 42*b* are formed into a relatively long rectangular shape, and the other vane 42*b* is formed into a relatively wide trapezoidal shape. While widths of the three vanes 42*b* are approximately the same, a width of the other vane 42*b* is set to be larger than those of the three vanes 42*b*, resulting in a balance in the weight of the entire vane member 42.

Moreover, each of the vanes 42*b* is arranged between the shoes 44*a*, and a seal member 50 in a U shape, which is held in sliding contact with an inner peripheral surface of the housing 44, and a plate spring for pressing the seal member 50 against the inner peripheral surface of the housing 44 are respectively fitted into and held in a narrow and long holding groove formed in each outer surface of the vane 42*b* in the axial direction. Moreover, two approximately circular recessed grooves are formed on each of side surfaces of the vanes 42*b* on the same side as the rotational direction of the drive shaft 4. Moreover, each of four advanced-side hydraulic chambers 51 and four retarded-side hydraulic chambers 52 is partitioned and formed between a side surface of each of the shoes 44*a* and a side surface of each of the vanes 42*b*.

As illustrated in FIG. 3, the hydraulic circuit 43 includes two systems of hydraulic passage, which are a first hydraulic passage 53 for supplying and discharging a hydraulic pressure of a working fluid to and from the respective advanced-side hydraulic chambers 51 and a second hydraulic passage 54 for supplying and discharging a hydraulic pressure of the working fluid to and from the respective retarded-side hydraulic chambers 52. A hydraulic supply passage 55 and a drain passage 56 are respectively connected to both of the hydraulic passages 53 and 54 via an electromagnetic switching valve 57 for passage switching. While a one-way oil pump 59 for pressure-feeding oil in an oil pan 58 is arranged on the supply passage 55, a downstream end of the drain passage 56 communicates to the oil pan 58. The first and second hydraulic passages 53 and 54 are formed inside a cylindrical passage construction part 60. One end of this passage construction part 60 is arranged so as to be inserted from the small diameter cylindrical part of the vane rotor 42*a* into a support hole 42*c* inside the vane rotor 42*a*, and the other end thereof is connected to the electromagnetic switching valve 57.

Moreover, three ring-shaped seal members 61 for partitioning and sealing one end sides of the respective hydraulic passages 53 and 54 are fitted and fixed between an outer peripheral surface of the one end of the passage construction part 60 and an inner peripheral surface of the support hole 42c. The first hydraulic passage 53 includes an oil chamber 53a formed at an end on the drive shaft 4 side of the support hole 42c, and four branch passages 53b formed approximately radially inside the vane rotor 42a for communication between the oil chamber 53a and the respective advanced-side hydraulic chambers 51. On the other hand, the second hydraulic passage 54 is blocked inside the one end of the passage construction part 60, and includes a ring-shaped chamber 54a formed on the outer peripheral surface of the one end, and a second oil passage 54b formed by being bent into an approximately L shape inside the vane rotor 42a for communication between the ring-shaped chamber 54a and the respective retarded-side hydraulic chambers 52.

The electromagnetic switching valve 57 is a switching valve of a four-port/three-position type, and an inside valve body is configured to control relative switching between each of the hydraulic passages 53 and 54 and the supply passage 55 or the drain passage 56. The electromagnetic switching valve 57 is activated for the switching by the control signal from the control device 117 that is an electronic controller (ECU). As illustrated in FIG. 3, the three positions include a phase advancing conversion position (left side position of the electromagnetic switching valve 57), a phase retarding conversion position (right side position thereof), and a phase holding position (center position thereof). Which one of the three positions is activated can be selected by operating the electromagnetic switching valve 57.

The control device 117 detects the engine operation state, and also detects a relative rotational position between the timing sprocket 46 and the drive shaft 4 based on signals from the crank angle sensor and cam angle (drive shaft phase) sensors on the intake side and the exhaust side. Then, the phase advancing conversion position is activated by the switching operation of the electromagnetic switching valve 57, and the working fluid is thus supplied to the advanced-side hydraulic chambers 51 to control the vane phase to advance. Moreover, the phase retarding conversion position is activated, and the working fluid is thus supplied to the retarded-side hydraulic chambers 52 to control the vane phase to retard. Further, the phase holding position is activated, and the working fluid is thus held (sealed) in both the hydraulic chambers 51 and 52 to control the vane phase to be held.

Figure 7A:
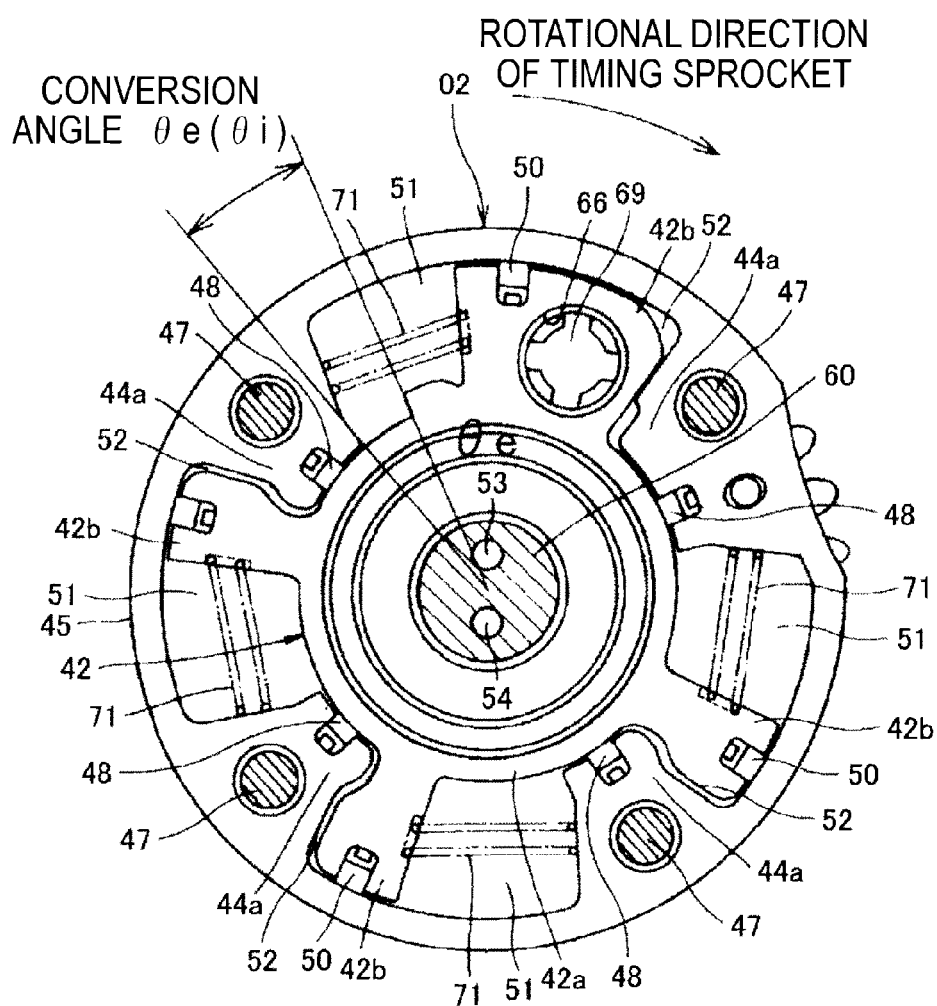
FIG. 7A is an explanatory diagram illustrating an operation at the most advanced position of an exhaust-side hydraulic valve timing control mechanism (E-VTC) constructing the exhaust-side variable valve actuating mechanism (E-VVA).
Figure 7B:
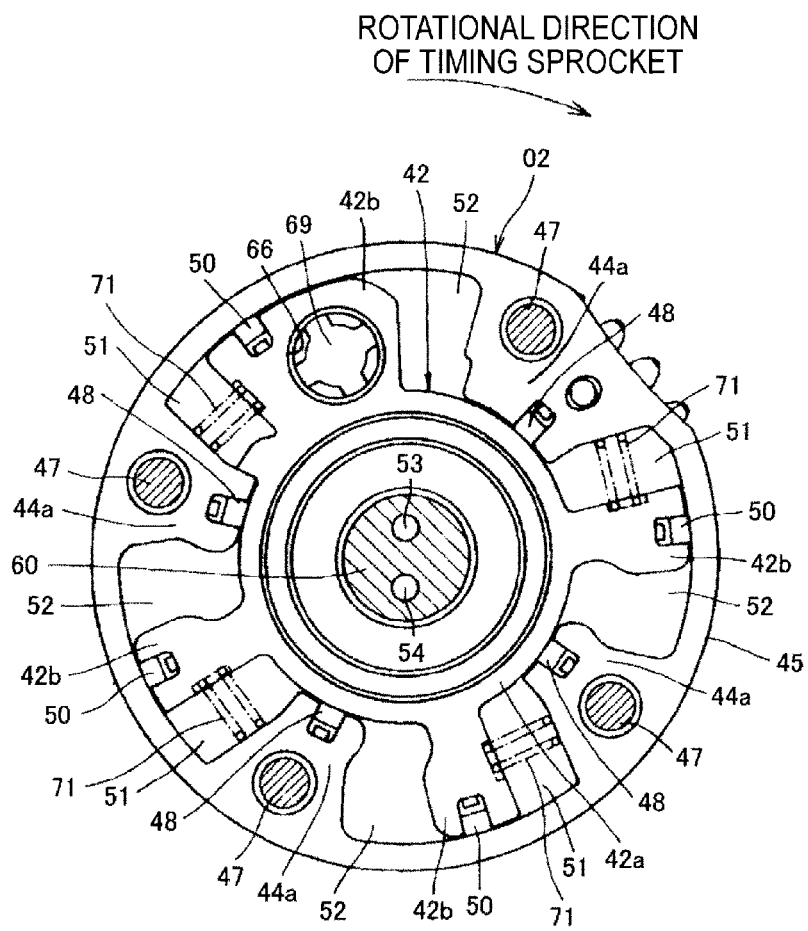
FIG. 7B is an explanatory diagram illustrating an operation of the most retarded position of the exhaust-side hydraulic valve timing control mechanism (E-VTC).

Moreover, a lock mechanism for constraining and releasing the constraint of the rotation of the vane member 42 with respect to the housing 44 is provided between the vane member 42 and the housing 44. That is, the lock mechanism is, as illustrated in FIGS. 3, 7A, and 7B, formed between the one vane 42b larger in the width and the thick rear cover 46, and includes a sliding hole 66 formed along the axial direction of the drive shaft 4 in the vane 42b, a lock pin 67 in a closed cylindrical shape arranged inside the sliding hole 66 in a freely slidable manner, an engagement hole 68 formed in an engagement hole construction part in a cup shape in a lateral cross section, which is fixed to a fixing hole of the rear cover 46, for engaging and releasing a tapered tip 67a of the lock pin 67, and a spring member 70 in a coil spring shape held by a spring retainer 69 fixed to a bottom surface side of the sliding hole 66, for biasing the lock pin 67 toward the engagement hole 68. The hydraulic pressure is supplied from the advanced-side hydraulic chamber 51 side or the retarded-side hydraulic chamber 52 side to the engagement hole 68 via an oil hole (not shown).

Then, the tip 67a of the lock pin 67 engages with the engagement hole 68 by the spring force of the spring member 70 at a position (first position) where the vane member 42 is rotated to the most advanced side, to thereby lock the relative rotation between the timing sprocket 41 and the drive shaft 4. Moreover, the lock pin 67 is configured to be moved backward by the hydraulic pressure supplied from the advanced-side hydraulic chambers 51 to the inside of the engagement hole 68, to thereby release the engagement with the engagement hole 68. Further, four coil springs 71, which are biasing member for rotationally biasing the vane member 42 toward the advanced side, are arranged between one side surface of each vane 42b and an opposing surface of each shoe 44a opposing this side surface. The respective coil springs 71 are independently arranged. Each axial length (coil length) is set to be more than a length between the side surface of the vane 42b and the opposing surface of the shoe 44a, and both of them are set to the same length.

On the other hand, the intake-side hydraulic valve timing control mechanism (I-VTC) 3 is arranged on the intake valve 123 side as on the exhaust side. The intake-side hydraulic valve timing control mechanism (I-VTC) 3 is formed into the same construction as that of the exhaust-side hydraulic valve timing control mechanism (E-VTC) 2. Though a specific description is omitted, the vanes are biased toward the advance side by coil springs, and are further locked at this position as in the exhaust-side hydraulic valve timing control mechanism (E-VTC) 2. A different point is that while the conversion angle of the vanes is θe on the exhaust side, the conversion angle is θi on the intake side.

A description is now given of an operation of the exhaust-side hydraulic valve timing control mechanism (E-VTC) 2. First, when an ignition key is turned off to stop the engine, an output of a control current from the control device 117 to the electromagnetic switching valve 57 is stopped, and the valve body is pushed by the spring force of the spring so as to control the supply passage 55 and the first hydraulic passage 53 on the advance side to communicate with each other. In other words, in the electromagnetic switching valve 57 illustrated in FIG. 3, the phase advancing conversion position on the left side is activated. Thus, the vane member 42 tries to rotate toward the advance side by the supplied hydraulic pressure. However, as the number of engine revolutions approaches zero, the discharged hydraulic pressure of the oil pump 59 decreases, and the supplied hydraulic pressure also becomes zero.

On this occasion, the vane member 42 tends to be stabilized in the retard direction by a valve train friction acting on the drive shaft 4. However, as illustrated in FIG. 7A, the vane member 42 relatively rotates by the strong spring forces of the respective coil springs 71 clockwise, which is the rotation direction (arrow direction) of the drive shaft 4 with respect to the timing sprocket 41, namely, the advance direction, and is stabilized to the most advanced position without the application of the hydraulic pressure of the oil pump 19. As a result, the vane member 42 is held at a position at which the vane 42b having the maximum width is brought into abutment against the side surface of the shoe 44a on the retarded-side hydraulic chamber 52 side, and this is a position where the drive shaft 4 is converted to the most advanced side with respect to the timing sprocket 41. Moreover, simultaneously at this position, the tip 67a of the lock pin 67 engages with the inside of the engagement hole 68, so as to restrict a free relative rotation between the timing sprocket 41 and the drive shaft 4.

Thus, even when a rotational fluctuation is large as in cranking when the engine restarts, the vane member 42 is mechanically stabilized to the most advanced position. Further, the vane member 42 is fixed by the lock pin 67, and the vane member 42, namely, the phase of the drive shaft 4, can be stabilized. Moreover, flapping thereof can be suppressed. As a result, instability of the valve timing control can be suppressed, and an excellent start property and a reduction in the cold emission can be surely acquired.

On the other hand, the intake-side hydraulic valve timing control mechanism (I-VTC) 3 is mechanically stable at the most advanced position as the exhaust-side hydraulic valve timing control mechanism (E-VTC) 2, and similarly the vane member is fixed by the lock pin.

A description is again given of the exhaust-side hydraulic valve timing control mechanism (E-VTC) 2. After the engine is started, the electromagnetic switching valve 57 is located at the position (phase advancing conversion position) illustrated in FIG. 2 by the valve body spring and the control current from the control device 117 to the electromagnetic switching valve 57. The working fluid pressure-fed from the oil pump 59 is supplied from the first hydraulic passage 53 to the respective advanced-side hydraulic chambers 51 so as to hold the vane member 42 to the most advanced side in cooperation with the spring forces of the coil springs 71. When the working fluid pressure in the advanced-side hydraulic chambers 51 increases, the lock pin 67 is removed by this high fluid pressure from the engagement hole 68 so as to permit the free turn of the vane member 42. Then, as described before, the phase advancing control, the phase retarding control, and the phase holding control can be freely carried out by the three position control by the electromagnetic switching valve 57.

Thus, the open phase and the close phase of the exhaust valves 124 can be controlled by operating the exhaust-side hydraulic valve timing control mechanism (E-VTC) 2. Moreover, similarly, the open phase and the close phase of the intake valves 123 can be controlled by operating the intake-side hydraulic valve timing control mechanism (I-VTC) 3. Moreover, the exhaust valves can be opened in the intake stroke so as to control the open lift and the operation angle (=open period) by the exhaust sub-lift control mechanism (E-SVEL) 1. Further, the open phase and the close phase can further freely be controlled by using the exhaust sub-lift control mechanism (E-SVEL) 1 together with the exhaust-side hydraulic valve timing control mechanism (E-VTC) 2. One feature of this embodiment is to use the variable valve actuating control mechanism (VVA) to appropriately carry out the internal EGR.

Figure 8A:
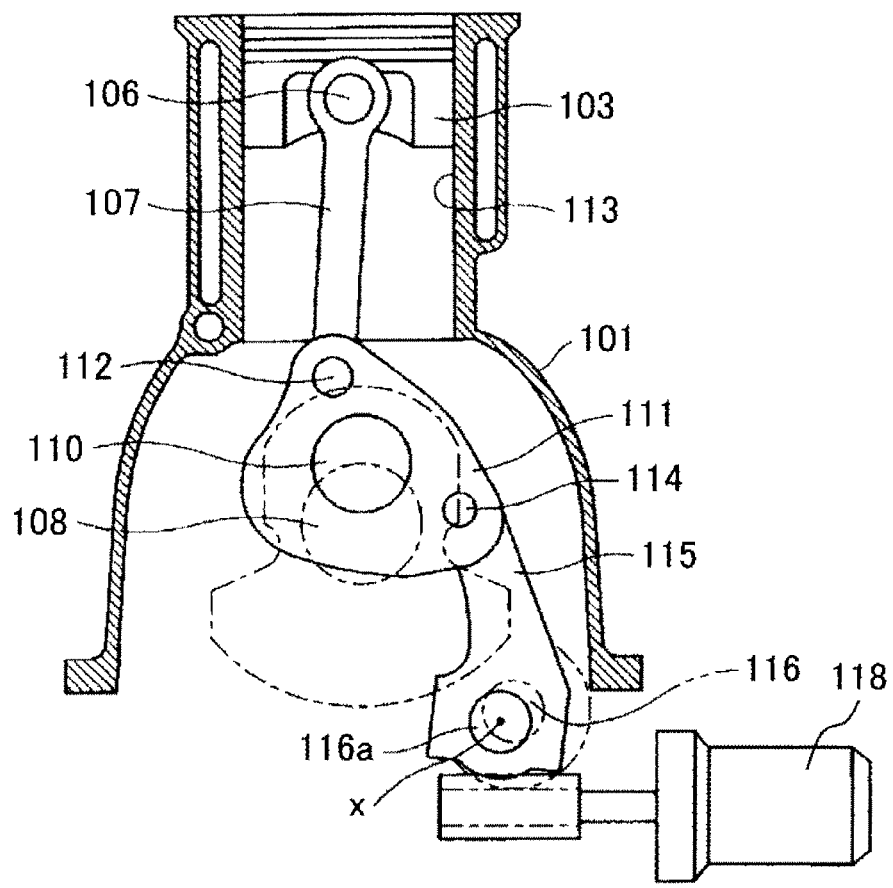
FIG. 8A is an explanatory diagram illustrating an operation of a variable mechanical compression ratio control mechanism (VCR) at the maximum mechanical compression ratio.
Figure 8B:
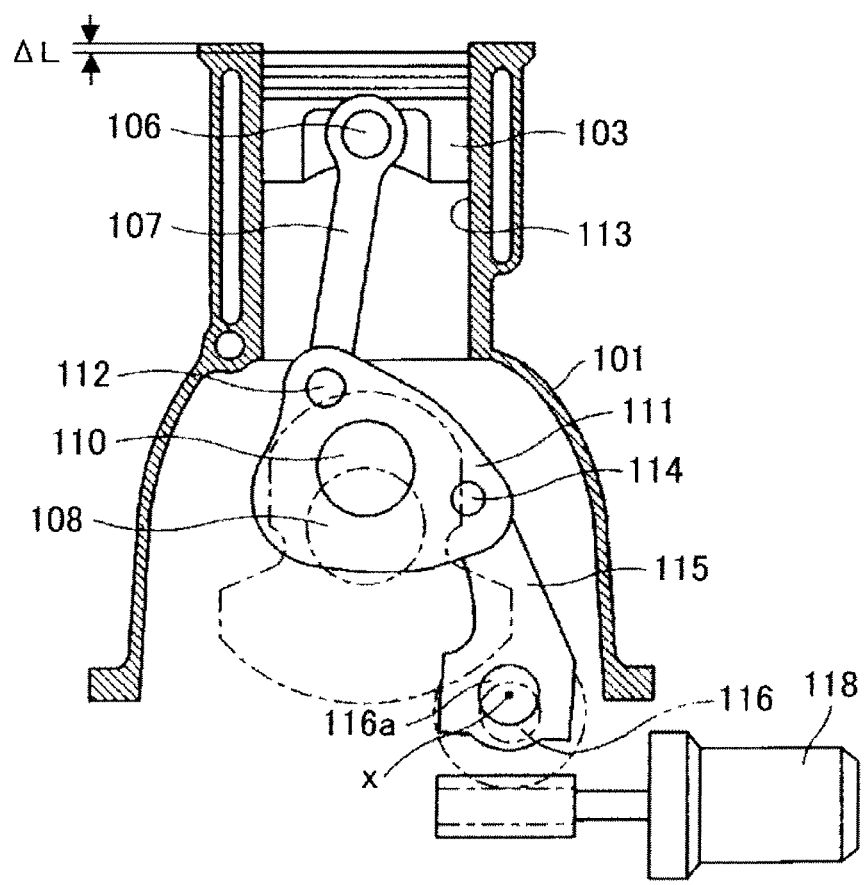
FIG. 8B is an explanatory diagram illustrating an operation of the variable mechanical compression ratio control mechanism (VCR) at the minimum mechanical compression ratio.

Referring to FIGS. 8A and 8B, a brief description is now given of a configuration of the variable mechanical compression ratio control mechanism (VCR). The crankshaft 108 includes the plurality of journal parts and crankpins 110, and the journal parts are supported in a freely rotatable manner by the main bearings of the cylinder block 101. The crankpin 110 is offset by a predetermined amount from the journal part, and the lower link 111 is coupled in a freely rotatable manner to the crankpin 110. The lower link 111 is configured to be divided into two members, which are left and right members, and the crankpin 110 is fitted in a freely rotatable manner into a coupling hole approximately at the center of the lower link 111. The upper link 107 coupled via the coupling pin 112 to the one end of the lower link 111 has the upper end coupled in a freely turnable manner to the piston 103 via the piston pin 106. The piston 103 receives a combustion pressure so as to reciprocate in the cylinder 113 of the cylinder block 101.

Above the cylinder 113, the intake valves 123 and the exhaust valves 124 supported in the cylinder head 102 in a freely openable/closable manner are arranged. The control link 115 has the upper end coupled to the other end of the lower link 111 via the coupling pin 114, and has the lower end swingably coupled to the lower part of the cylinder block 101 via the control shaft 116. In other words, the control shaft 116 is supported by the cylinder block 101, and includes the eccentric cam 116a eccentric with respect to a rotational center thereof. The lower end of the control link 115 is coupled in a freely rotatable manner to the eccentric cam 116a.

The turn position of the control shaft 116 is controlled based on a control signal from the control device 117 by the compression ratio control actuator 118 using an electric motor and a speed reduction mechanism. Thus, as illustrated in FIG. 8A, when the control shaft 116 is turned in one direction (counterclockwise direction of FIG. 8A) by the compression ratio control actuator 118, in the variable mechanical compression ratio control mechanism (VCR), a center position X of the eccentric cam 116a moves to a lower left position of FIG. 8A. As a result, the swing support position at the lower end of the control link 115 changes, and, as a result, a stroke position of the piston 103 changes, resulting in a change to a control position maximum in the mechanical compression ratio, namely a control position highest in the piston top dead center position.

On the other hand, when the control shaft 116 is turned toward the other direction (clockwise direction of FIG. 8A), as illustrated in FIG. 8B, the center position X of the eccentric cam 116a moves to a vertically upward position of FIG. 8B. As a result, the swing support position at the lower end of the control link 115 changes, and, as a result, the stroke position of the piston 103 changes downward by ΔL compared with that of FIG. 8A, resulting in a change to a control position minimum in the mechanical compression ratio, namely, a control position lowest in the piston top dead center position.

A detailed description is now given to an embodiment of the present invention. A basic idea of this embodiment resides in the following point. The variable valve actuating control mechanism (VVA) for controlling the internal EGR amount and the variable mechanical compression ratio control mechanism (VCR) for controlling the mechanical compression ratio are installed on the internal combustion engine. The mechanical compression ratio change control by the variable mechanical compression ratio control mechanism (VCR) is suppressed, and the internal EGR amount change control by the variable valve actuating control mechanism (VVA) is carried out preferentially or on a preferential basis in the first operating region in which the compression self-ignition combustion is carried out. The internal EGR amount change control by the variable valve actuating control mechanism (VVA) is suppressed, and the mechanical compression ratio change control by the variable mechanical compression ratio control mechanism (VCR) is carried out preferentially or on a preferential basis in the second operating region in which the spark ignition combustion is carried out. On this occasion, the description "suppressing the control" means a state where the control is stopped, the control is carried out but the control amount is maintained to be constant, or a change amount in the control amount is small. Moreover, the description "carrying out the control preferentially or on a preferential basis" means a state opposite to the state of "suppressing the control", and means a state where the control is carried out and the control amount changes, to thereby control a substantial physical amount.

Incidentally, a description is now given of a specific control method for the variable combustion system according to this embodiment using the variable valve actuating control mechanism (VVA) and the variable compression ratio control mechanism (VCR) described above. On this occasion, the function of the exhaust sub-lift control mechanism (E-SVEL) 1 is to open the exhaust valves in the intake stroke so as to reintroduce the combustion gas on the exhaust port 122 side into the combustion chamber 104 of the cylinder as the internal EGR.

Figure 11:
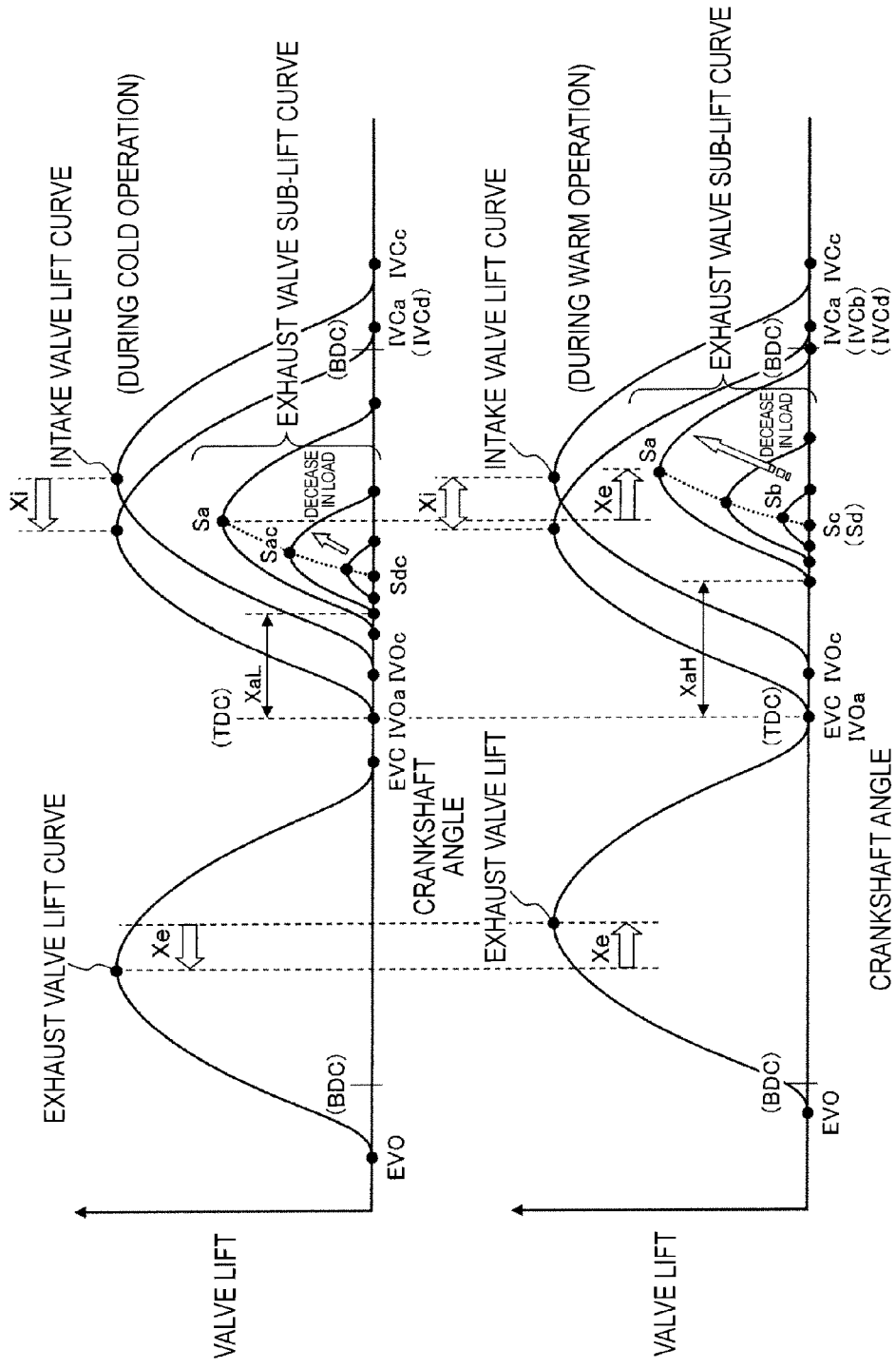
FIG. 11 is a characteristic diagram illustrating lift characteristics of intake valves and exhaust valves by a variable valve actuating mechanism (VVA) in a warm operation state and a cold operation state.

A sub-lift lift amount S of the exhaust sub-lift control mechanism (E-SVEL) 1 can change from the maximum lift Sa through the small lift Sb to the zero lift Sc illustrated in a characteristic diagram on a lower side (warm operation) of FIG. 11. As a result, the internal EGR amount can be adjusted. It should be noted that Sa corresponds to the above-mentioned maximum lift amount L3, and Sb corresponds to the above-mentioned small lift amount L1. On this occasion, FIG. 11 illustrates lift curve characteristics of the intake valves 123 and the exhaust valves 124. The characteristic diagram on the lower side (warm operation) of FIG. 11 illustrates a characteristic of a state when or after the warmup of the internal combustion engine is completed. A characteristic diagram on an upper side (cold operation) of FIG. 11 illustrates a characteristic during the cold operation state before the warmup of the internal combustion engine is completed.

Figure 9:
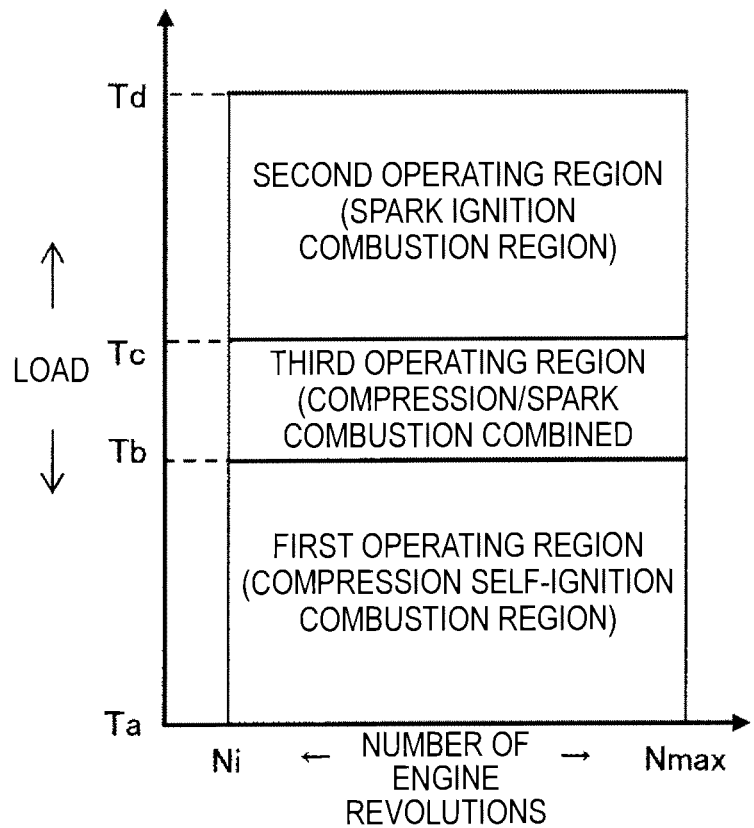
FIG. 9 is an explanatory diagram illustrating combustion forms corresponding to a load in a warm operation state.

FIG. 9 illustrates an operating region (map) representing changes in a combustion form in a state in which the internal combustion engine is warmed up. A horizontal axis represents the number of engine revolutions, Ni denotes an idling number of revolutions, and Nmax denotes the maximum permissible number of revolutions or the maximum output number of revolutions. Moreover, a vertical axis represents a load on the internal combustion engine, and an engine torque or the like is assigned. A load Ta denotes a no-load state such as idling, and the load (engine torque or shaft torque) is approximately zero (no load). Moreover, the load Td is the maximum load. It should be noted that a description is given of a case in which the engine torque is assigned as the load represented by the vertical axis, but the shaft torque or a ratio of the load (load ratio) to the maximum load at each number of engine revolutions may be assigned.

As illustrated in FIG. 9, the compression self-ignition combustion is carried out in the first operating region on a low load side, and the spark ignition combustion is carried out in the second operating region on a high load side. Then, a third operating region is set between the first operating region and the second operating region. The third operating region is a combined combustion region where both the self-ignition combustion and the spark ignition combustion are used.

In this third operating region, when almost all the mixture is combusted by the compression self-ignition combustion, even if the ignition plug 105 carries out the spark discharge, an amount of the mixture combusted by the spark ignition is small. On the other hand, when the compression self-ignition is difficult, and only a part of the mixture is combusted by the compression self-ignition, the remaining majority of mixture is combusted by the spark ignition by the ignition plug 105. When an approximately half of the mixture is combusted by the compression self-ignition, the remaining half is combusted by the spark ignition. In this way, in the third operating region, the compression self-ignition combustion and the spark ignition combustion are simultaneously used so as to secure certain combustion of the mixture.

As described above, according to this embodiment, the combustion form is changed in the respective regions set depending on the number of engine revolutions and the load so as to increase the combustion stability of the compression self-ignition and further increase the fuel efficiency performance in the low load side, and to increase the anti-knocking capability and the combustion stability of the spark ignition combustion on the high load side. It should be noted that the third operating region is set depending on necessity, and when the first operating region and the second operating region are only required, the third operating region does not need to be set. According to this embodiment, the third operating region is set to realize a smooth change between the first operating region and the second operating region. A reason for this is described later.

Figure 10:
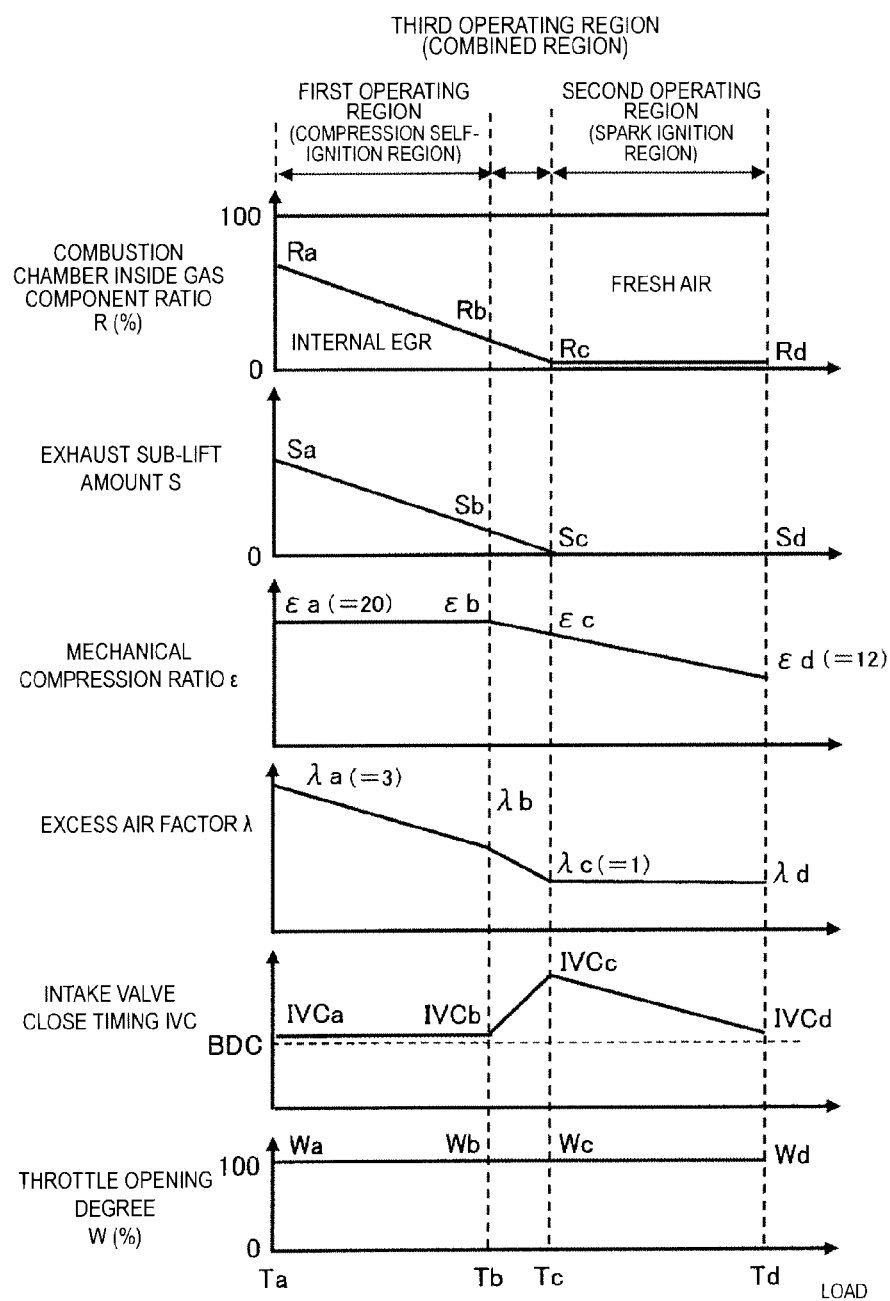
FIG. 10 is an explanatory diagram illustrating control characteristics of respective control parameters of the variable combustion system with respect to the load in the combustion forms illustrated in FIG. 9.

Referring to FIGS. 10 and 11, a description is now given of transitions among the first operating region where the compression self-ignition combustion is carried out, the third operating region where both the compression self-ignition combustion and the spark ignition combustion are used, and the second operating region where the spark ignition combustion is carried out, and changes in respective control parameters when the load on the warmed-up internal combustion engine changes.

In the characteristic diagrams of FIG. 10 and on the lower side (during warm operation) of FIG. 11, a throttle opening degree W of the throttle valve is controlled to a predetermined opening degree, and the intake air is supplied depending on this opening degree W. According to this embodiment, as illustrated in FIG. 10, the opening degree rate is approximately 100%, which represents the fully open state, so as to reduce an intake resistance as much as possible. The opening degree is maintained to be an opening degree of from Wa to Wb between loads Ta and Tb in the first operating region, is maintained to be an opening degree of from Wb to Wc between loads Tb and Tc in the third operating region, and is maintained to be an opening degree of from Wc to Wd between loads Tc and Td in the second operating region. As appreciated from this, the opening degree rate is approximately 100%, which represents the fully open state, over the entire load region. It should be noted that the opening degree rate is not limited to 100%, and only needs to be appropriately set to a predetermined opening degree depending on the internal combustion engine to be applied.

Moreover, as illustrated in the characteristic diagrams of FIG. 10 and on the lower side (during the warm operation) of FIG. 11, the close phase (timing) IVC of the intake valves 123 is adjusted by the intake-side hydraulic valve timing control mechanism (I-VTC) 3. In other words, the close phase IVC is maintained to be a close phase of from IVCa to IVCb in the vicinity of the bottom dead center (BDC) between the load Ta and the load Tb in the first operating region. Moreover, the close phase is retarded as the load increases as the close phase of from IVCb to IVCc represents between the load Tb and the load Tc in the third operating region. Further, as the close phase of from IVCc to IVCd represents, the close phase is advanced from the retarded position to the bottom dead center (BDC) as the load increases between the load Tc and the load Td in the second operating region. The close phase IVCa and the close phase IVCd are substantially the same phase.

Moreover, an excess air factor $\lambda$ is controlled by the fuel injection valve 120. The excess air factor $\lambda$ is a mixture ratio of the air to the fuel. In the load of from Ta to Tb in the first operating region, the ratio of the fuel gradually increases from an excess air factor $\lambda a$ (=3) representing a lean mixture ratio, and $\lambda$ thus decreases to $\lambda b$. Moreover, the ratio of the fuel is further increased from $\lambda b$ to $\lambda c$ (=1) in the load of from Tb to Tc in the third operating region. Then, the ratio is controlled to be λ=1, which is the stoichiometry, as λc to λd, in the load of from Tc to Td in the second operating region. It should be noted that feedback control for the excess air factor λ is carried out by using an oxygen sensor installed on an exhaust system in the spark ignition combustion so that the excess air factor is controlled to maintain λ=1.

Then, in the first operating region on the low load side, an exhaust valve sub-lift amount S by the exhaust sub-lift control mechanism (E-SVEL) 1 is the maximum sub-lift amount Sa at the load Ta, which is no load, decreases as the load increases, and decreases to a sub-lift amount Sb at the maximum load Tb in the first operating region. As a result of the opening of the exhaust valves 124 by the exhaust sub-lift control mechanism (E-SVEL) 1 in the intake stroke, the pressure in the combustion chamber 104 decreases as the piston moves down. Accordingly, the high-temperature exhaust gas existing in the exhaust ports 122 is sucked again in the combustion chamber 104. The sub-lift amount S is controlled depending on the load. Thus, a ratio R of the internal EGR in the gas in the combustion chamber 104 also decreases from the maximum ratio Ra of the internal EGR at the load Ta to a ratio Rb of the internal EGR at the load Tb.

In other words, the sub-lift amount S by the exhaust sub-lift control mechanism (E-SVEL) 1 is increased toward the low load side on which an ignition property of the compression self-ignition combustion is low, and as a result, the ratio R of the high-temperature internal EGR is actively increased so as to increase the gas temperature in the combustion chamber 104. As a result, an ignition property of the mixture is increased so as to increase the stability of the compression self-ignition combustion. Particularly, in the internal EGR by the exhaust sub-lift control mechanism (E-SVEL) 1, the combustion gas is directly introduced from the exhaust port side, and the temperature is thus sufficiently high compared with an ordinary internal EGR caused by a positive valve overlap (overlap section in which the intake valves and the exhaust valves open). As a result, the gas temperature in the combustion chamber 104 can be sufficiently increased so as to further increase the combustion stability.

Further, in the first operating region, the variable mechanical compression ratio control mechanism (VCR) maintains and controls the mechanical compression ratio ε uniformly to an approximately constant value of about εa=20 close to the maximum value (which means suppression of the control), and hence the gas temperature at the compression top dead center can be further increased, resulting in an increase in the stability of the combustion. It should be noted that the mechanical compression ratio s does not always need to be set close to the maximum value, and may be set to a mechanical compression ratio slightly lower than the maximum value if the combustion is stable. This setting permits narrowing a control range of the VCR. On the other hand, when the mechanical compression ratio ε is set to the maximum value, a thermal efficiency can be maximized, and it should be understood that the fuel efficiency further increases. Moreover, the mechanical compression ratio ε is almost constant from the mechanical compression ratio εa at the load Ta to the mechanical compression ratio Σb at the load Tb. As a result, while a change in the gas temperature in the combustion chamber 104 caused by a change in the mechanical compression ratio ε is suppressed, an in-cylinder gas temperature can highly precisely be controlled by the above-mentioned exhaust sub-lift control mechanism (E-SVEL) 1, and the combustion stability can be increased also in this respect. The term "high precision" is used on this occasion because one of the parameters (mechanical compression ratio ε) affecting the in-cylinder gas temperature can be substantially eliminated. Moreover, according to this embodiment, the characteristics such as the sub-lift amount and the open timing thereof continuously change, and gas temperature in the combustion chamber 104 is thus finely controlled. Thus, the combustion stability can be increased also in this respect.

On this occasion, the phase of the drive shaft 4 relating to the exhaust sub-lift control mechanism (E-SVEL) 1 is controlled by the exhaust-side hydraulic valve timing control mechanism (E-VTC) 2, and the phase change in the exhaust stroke of the exhaust valves 124 and the phase change in the sub-lift S in the intake stroke are synchronized. As illustrated in the characteristic diagram on the lower side (during the warm operation) of FIG. 11, the exhaust-side hydraulic valve timing control mechanism (E-VTC) 2 is controlled to attain the most retarded phase on the side retarded by a crank angle Xe from the most advanced phased in the characteristic diagram on the upper side (during cold operation). A peak lift phase of the sub-lift is also the most retarded phase. For example, in view of the maximum lift amount Sa, the open timing of the exhaust valves 124 by the exhaust sub-lift control mechanism (E-SVEL) 1 is retarded by an angle XaH from the top dead center (TDC).

As a result, cold fresh air is introduced into the combustion chamber 104 at a beginning of the intake stroke, and the exhaust valves 124 are opened by the exhaust sub-lift control mechanism (E-SVEL) 1 at the phase retarded from the top dead center (TDC) by the angle XaH. As a result, the high temperature exhaust gas is reintroduced from the exhaust ports 122 into the combustion chamber 104. The cold fresh air and the high temperature internal EGR gas are not immediately mixed evenly in terms of temperature, and a stratification phenomenon is generated by the temperatures in the combustion chamber 104. As a result, the compression self-ignition combustion starts from parts at high temperatures, and the combustion smoothly propagates to the low temperature side. An explosive combustion noise which is caused by simultaneous combustion in the combustion chamber 104, which tends to constitute a problem in the compression self-ignition combustion, is less liable to occur. As a result, the compression self-ignition combustion providing a high fuel efficiency can be extended to the high load region side, resulting in a further increase in the fuel efficiency performance in the actual travel.

Other control parameters are now considered. The intake-side hydraulic valve timing control mechanism (I-VTC) 2 is maintained at almost the most advanced phase (intake valve lift characteristic on the left side illustrated in the characteristic diagram on the lower side (during the warm operation) of FIG. 11). As a result, the close timing (IVC) of the intake valves 123 is advanced to the vicinity of the bottom dead center (BDC) (IVCa to IVCb of FIG. 10), and is almost a constant timing in the first operating region. As a result, a decrease in an effective compression ratio, namely, a decrease in the temperature in the vicinity of the compression top dead center (TDC) caused by a retardation of the close timing (IVC) of the intake valves from the vicinity of the bottom dead center (BDC) can be suppressed in the entire first operating region, and an ignition property and the combustion stability can be increased in this respect. It should be noted that the effective compression ratio is a compression ratio calculated while assuming that the compression starts at the close timing (IVC) of the intake valve, and, in addition to the mechanical compression ratio, influence at the close timing (IVC) of the intake valve is added. Approximately the same close timing (IVC) is maintained in the entire first operating region, and a change in the gas temperature (compression top dead center temperature) in the combustion chamber 104 caused by the close timing (IVC) change can thus be suppressed. The gas temperature can thus be highly precisely controlled by the internal EGR by the exhaust sub-lift control mechanism (E-SVEL) 1 described above, and the combustion stability can be increased in this respect. The term "high precision" is used on this occasion because one of the parameters (IVC) affecting the in cylinder gas temperature can be substantially eliminated.

Further, the throttle opening degree is approximately full, and is approximately constant across the entire first operating region. Therefore, an intake pipe pressure is close to the atmospheric pressure, and is thus also maintained to be approximately constant. As a result, not only the pumping loss caused by the throttling is suppressed, but also changes in the gas pressure and the gas temperature in the combustion chamber 104 caused by the intake pipe pressure change can be suppressed, and the gas temperature by the internal EGR of the exhaust sub-lift control mechanism (E-SVEL) 1 described above can be highly precisely controlled. Therefore, the combustion stability can be increased in this respect, and the fuel efficiency can be further increased.

It should be noted that, according to this embodiment, the control of the load value (engine torque value) is mainly carried out by the control of the excess air factor λ and the internal EGR amount. For example, for the no load (engine torque Ta) during the idling, the combustion torque is only required to cope with a mechanical friction. Therefore, the excess air factor λ is set to λa=3, which corresponds to an extremely lean state, and the internal EGR amount is set to a large ratio Ra. Thus, the fresh air (=fuel) is decreased accordingly so as to suppress the load. On this occasion, when the excess air factor λ increases, and the fresh air decreases, the combustion tends to be unstable. However, the combustion stability is increased by using the exhaust sub-lift control mechanism (E-SVEL) 1 to highly precisely control the gas temperature so as to be high in the combustion chamber 104, which eliminates this problem. As a result, the extremely lean combustion high in the thermal efficiency is carried out, the combustion stability is increased, and more excellent fuel efficiency performance can be obtained in the compression self-ignition combustion.

A case in which control for the air amount and the internal EGR amount based on the throttle opening degree in place of the excess air factor λ is used for the load control is assumed. The pumping loss is increased by the throttling, resulting in a decrease in the fuel efficiency, and changes in the gas pressure and the gas temperature in the combustion chamber 104 are generated by the change in the intake pipe pressure change, resulting in a decrease in the combustion stability. This case is thus not preferable. Therefore, according to this embodiment, the load control by using the throttle opening degree is not carried out.

According to this embodiment, in the first operating region in which the compression self-ignition combustion is carried out, the mechanical compression ratio change control by the variable mechanical compression ratio control mechanism (VCR) is suppressed so as to maintain a constant high mechanical compression ratio, and the internal EGR amount change control by the exhaust sub-lift control mechanism (E-SVEL) 1 of the variable valve actuating control mechanism (VVA) is preferentially carried out so as to actively adjust the internal EGR amount. As a result, the combustion stability in the compression self-ignition combustion on the low load side can be increased, and the fuel efficiency can be sufficiently increased. It should be noted that, on this occasion, the mechanical compression ratio is maintained to be an approximately constantly high value by the VCR, and the IVC is maintained to be an approximately constant value in the vicinity of the bottom dead center by the intake-side hydraulic valve timing control mechanism. As a result, excellent and stable combustion is obtained. Moreover, the increase in the thermal efficiency itself by the high compression ratio and the lean combustion, and the decrease in the pumping loss by the almost fully open throttle also contribute to the increase in the fuel efficiency.

A consideration is now given of the second operating region on the high load side. The spark ignition combustion is carried out in the range from the load Tc to the maximum load Td. After the transition to this region, the sub-lift by the exhaust sub-lift control mechanism (E-SVEL) 1 is a zero lift as represented by the sub-lift amount of from Sc to Sd, and the exhaust sub-lift control is substantially suppressed or stopped. Therefore, the internal EGR is suppressed to an extremely small amount. This extremely small amount includes a small amount of high temperature residual gas left in the combustion chamber 104 in the vicinity of the exhaust top dead center at the end of the exhaust stroke and relatively high temperature internal EGR reintroduced into the combustion chamber 104 via a small lift (ramp section) of the intake/exhaust valves in the vicinity of the exhaust top dead center, and is a predetermined very small amount (according to this embodiment, extremely small amount), which is not zero.

Moreover, the mechanical compression ratio E is decreased by the variable mechanical compression ratio control mechanism (VCR) as the load increases so as to suppress an excessive increase in the gas temperature in the vicinity of the compression top dead center as the load increases. Moreover, the sub-lift control by the exhaust sub-lift control mechanism (E-SVEL) 1 is substantially suppressed or stopped, and hence the high temperature internal EGR amount is maintained to be an extremely small amount. As a result, the influence on the gas temperature in the combustion chamber 104 decreases, and the influence of the high temperature internal EGR is almost excluded. Thus, the knocking (abnormal combustion) phenomenon and the combustion instability phenomenon such as pre-ignition concerned in the spark ignition combustion region can be effectively and stably suppressed by the control of decreasing the mechanical compression ratio E by the variable mechanical compression ratio control mechanism (VCR).

In other words, as the load increases, the knocking tends to be generated in the internal combustion engine. Therefore, as illustrated in FIG. 10, while the mechanical compression ratio is maintained in a maximally high state as close to the vicinity of a limit capable of suppressing the knocking as possible, the mechanical compression ratio E is decreased in accordance with the load increase, and is decreased to a mechanical compression ration close to the minimum mechanical compression ratio ϵ=12 for the full load. As a result, while the knocking is suppressed, the thermal efficiency (mechanical compression ratio) can be maximally increased so as to increase the fuel efficiency in the spark ignition combustion region. Further, according to this embodiment, the mechanical compression ratio is reduced to ϵd=12 at the maximum load. Thus, not only the knocking but also a combustion speed and an increase rate (dP/dθ) of the combustion pressure can be suppressed.

Therefore, such a phenomenon that the combustion noise rapidly increases in the high load region, which is concerned in Japanese Patent Application Laid-open No. 2013-227941, can be avoided.

Further, other control parameters are now considered. The excess air factor λ from λc to λd is maintained to be the value λ=1 (namely, stoichiometry) corresponding to the theoretical air-fuel ratio across the second operating region. As the load increases, NOx discharged from the internal combustion engine tends to increase. However, when the excess air factor λ is controlled to be 1, NOx can easily be purified by a three-way catalyst provided on the exhaust system. In order to control the excess air factor λ to be 1, feedback control is only required to be carried out by using the oxygen sensor installed on the exhaust system.

Further, the control of the load (engine torque value) in the second operating region is mainly carried out by the control of the close timing (IVC) of the intake valves 123. In other words, as illustrated in the characteristic diagrams of FIG. 10 and on the lower side of FIG. 11 (during the warm operation), at the minimum load To in the second operating region, an intake lift curve (right side) is maximally retarded, and the close timing (IVC) of the intake valves 123 is the most retarded angle IVCc. The close timing (IVC) of the intake valves 123 is significantly retarded from the bottom dead center (BDC). Therefore, a large amount of the fresh air sucked in the combustion chamber 104 in the intake stroke is discharged again to the intake system after the bottom dead center (BDC). Therefore, a fresh air charging efficiency in the combustion chamber 104 decreases, and the engine torque, which is the load, is suppressed to the minimum load Tc in the second operating region.

Therefore, when the load is increased as illustrated in FIG. 10, the close timing (IVC) of the intake valves 123 is gradually advanced, and the close timing (IVC) of the intake valves 123 at the maximum load Td is the most advanced angle IVCd. This most advanced angle value IVCd is the most advanced position in the vicinity of the bottom dead center (BDC), and is similar to the close timings IVCa and IVCb of the intake valves 123 described before. On this occasion, a phase difference between the close timings IVCc and IVCd of the intake valves 123 is a crank angle Xi (vane conversion angle θi), which is an overall conversion angle of the intake-side hydraulic valve timing control mechanism (I-VTC) 3.

Incidentally, when the close timing of the intake valves 123 is changed in order to meet the load, the effective compression ratio is changed by the close timing of the intake valves 123. Thus, the mechanical compression ratio ε needs to be adjusted. Therefore, the mechanical compression ratio ε is adjusted to a limit that does not generate the knocking while assuming the change in the close timing of the intake valves 123 by the variable mechanical compression ratio control mechanism (VCR). As a result, the mechanical compression ratio is controlled by the variable mechanical compression ratio control mechanism (VCR) to continuously decrease from εc to εd between the load Tc and the maximum load Td. On this occasion, the mechanical compression ratio of from εC to εd is set to the maximum mechanical compression ratio that does not generate the knocking in the corresponding load.

When assuming a case where the load control is carried out by means of air amount control based not on the close timing (IVC) of the intake valves 123 but on the throttle opening degree, the pumping loss caused by the throttling increases, resulting in a degradation of the fuel efficiency, which is not preferred. Therefore, according to this embodiment, the load control by using the throttle opening degree is not carried out.

As described above, according to this embodiment, in the second operating region in which the spark ignition combustion is carried out, the internal EGR amount change control by the exhaust sub-lift control mechanism (E-SVEL) 1 is suppressed so as to maintain the internal EGR amount substantially to be an extremely small amount, and the mechanical compression ratio change control by the variable mechanical compression ratio control mechanism (VCR) is preferentially carried out so as to actively decrease and adjust the mechanical compression ratio. As a result, the anti-knocking capability and the combustion stability are increased, and the combustion noise of the spark ignition combustion can further be suppressed.

A description is now given of the control for the third operating region set between the first and second operating regions, for carrying out both the compression self-ignition combustion and the spark ignition combustion. In the third operating region, in addition to the compression self-ignition combustion, the spark ignition combustion by the ignition plug 105 is simultaneously carried out. In other words, spark discharge by the ignition plug 105 is carried out in the third operating region as in the second operating region.

Most of the mixture is combusted by the compression self-ignition combustion, and unburnt mixture is spark-ignition combusted by the spark discharge of the ignition plug 105 in a region slightly above the load Tb of the first operating region. On the other hand, the compression self-ignition combustion is difficult in a region slightly below the load Tc of the second operating region. In other words, as the load increases, an explosive abnormal combustion may occur when only the compression self-ignition combustion is carried out. Therefore, the internal EGR ratio is decreased, and while a part of the mixture is compression self-ignition combusted, the remaining majority of the mixture is controlled to transition to the spark ignition combustion by the ignition plug 105 that is capable of providing excellent combustion in the state in which the internal EGR ratio is low. As a result, occurrence of unstable combustion can be suppressed during the transition between the first operating region and the second operating region. In this way, in the third operating region, both the compression self-ignition combustion and the spark ignition combustion are used, resulting in the generation of a stable load.

Further, in the third operating region, the respective control parameters are continuously controlled in order to prevent the combustion instability from occurring by a switching of or a change in the combustion form. For example, the sub-lift amount S is controlled to continuously decrease from the sub-lift amount Sb to the sub-lift amount Sc (=zero lift) in the section of the third operating region. Thus, the internal EGR amount also continuously changes to decrease from the ratio Rb to the ratio Rc so as to enable the partial compression self-ignition combustion and the partial spark ignition combustion. Moreover, the mechanical compression ratio ε is also controlled to continuously decrease from εb to εc in the section of the third operating region, and the partial compression self-ignition combustion and the partial spark ignition combustion are enabled.

Further, the excess air factor λ is also controlled to be continuously rich from λb to λc in the section of the third operating region, and the close timing (IVC) of the intake valves 123 is controlled to transition from IVCb to IVCc substantially toward the retard side. This is because the method of adjusting the load is changed between the first operating region and the second operating region. In other words, this is because, while the load is adjusted by using the excess air factor λ without using the close timing (IVC) of the intake valves 123 in the first operating region, the load is adjusted by using the close timing (IVC) of the intake valves 123 without using the excess air factor λ in the second operating region.

Thus, the above-mentioned control parameters are adjusted in the third operating region so that the first operating region and the second operating region smoothly continue to each other without a large torque fluctuation. In this way, the respective control parameters are not switched stepwise between the first operating region and the second operating region, but are adjusted so as to continuously change in the section of the third operating region. As a result, the partial compression self-ignition combustion and the partial spark ignition combustion are enabled, resulting in the stable combustion.

Figure 12:
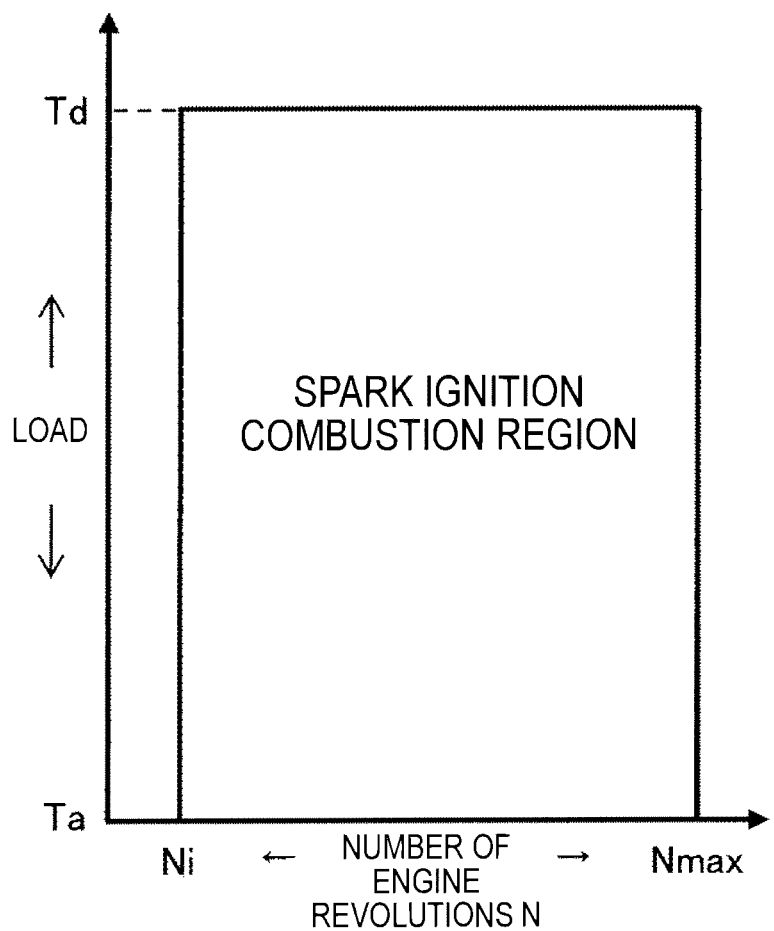
FIG. 12 is an explanatory diagram illustrating combustion forms corresponding to the load in the cold operation state.

A description is now given of the control in the cold state after the internal combustion engine is started and before the warmup is completed. When the combustion form is changed so as to carry out the compression self-ignition combustion when the internal combustion engine is cold, the gas temperature is originally low when the mixture is compressed. Thus, there is a high risk that a self-ignition property degrades, and stable combustion is not secured. Therefore, as illustrated in FIG. 12, the spark ignition combustion is carried out across the entire region so as to carry out reliable combustion of the mixture. A description is now given of a relationship between the load and the respective control parameters.

Figure 13:
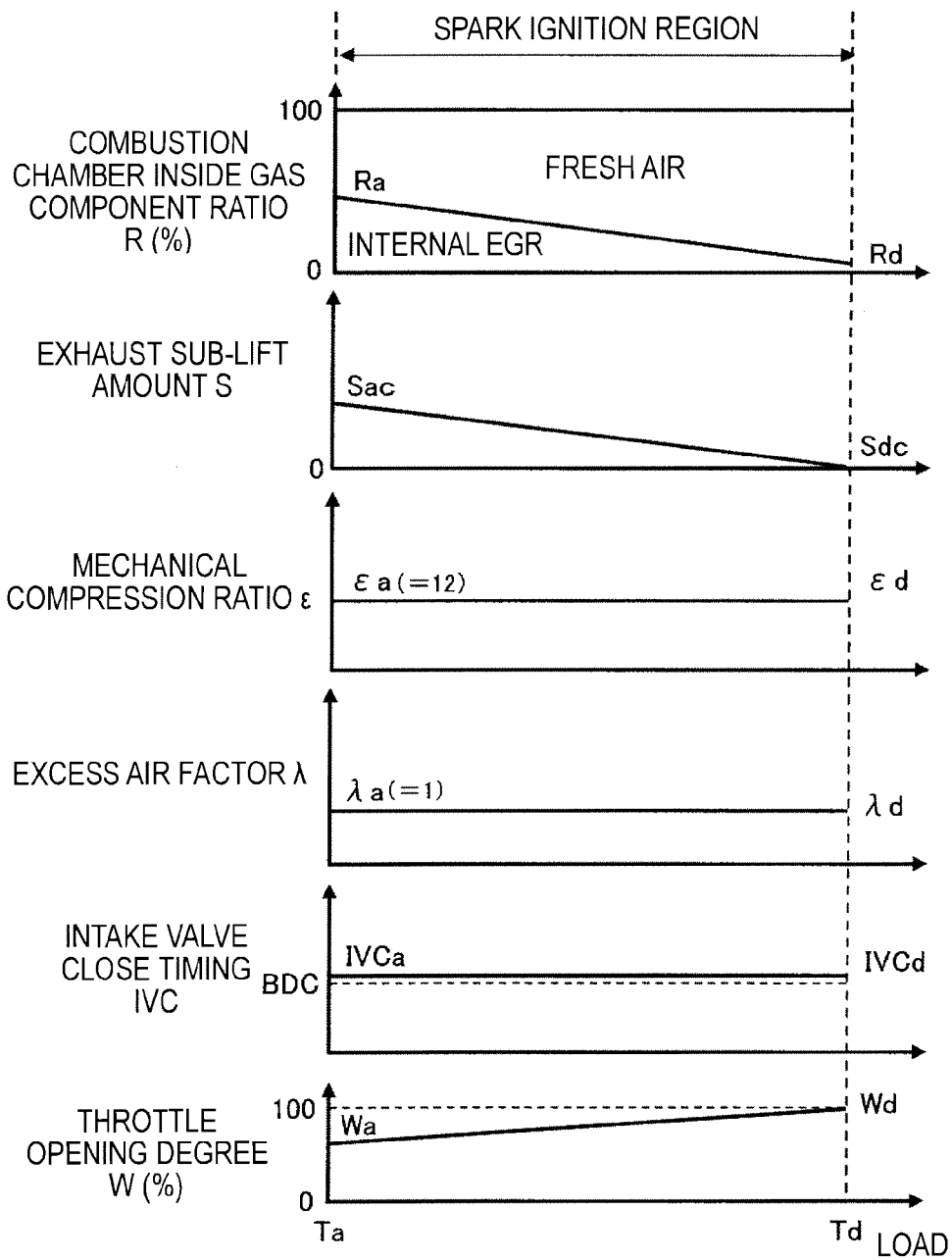
FIG. 13 is an explanatory diagram illustrating control characteristics of the respective control parameters of the variable combustion system with respect to the load in the combustion forms illustrated in FIG. 12.

In characteristic diagrams of FIG. 13 and on the upper side (during the cold operation) of FIG. 11, the throttle valve is opened during a predetermined opening degree at the load Ta at the idling. As the load increases, the intake air is supplied depending on this opening degree, and reaches an opening degree of 100% at the maximum load Td.

Moreover, as illustrated in the characteristic diagrams of FIG. 13 and on the upper side (during the cold operation) of FIG. 11, the close phase of the intake valves 123 is adjusted by the intake-side hydraulic valve timing control mechanism (I-VTC) 3. In other words, the close phase is set from IVCa to IVCd across the entire load region from the load Ta to the load Td. This close phase is maintained to be the same close phase in the vicinity of the bottom dead center (BDC). Similarly, the excess air factor λ is also controlled to be 1 across the entire load region (from λa to λd), and the mechanical compression ratio ε is also controlled to be 12 across the entire load region (from εa to εd). It should be noted that the mechanical compression ratio 12 is the minimum mechanical compression ratio in a VCR variable range. The exhaust temperature is increased by reducing the mechanical compression ratio (=expansion ratio) so as to promote a temperature increase of the three-way catalyst, resulting in a decrease in an exhaust emission.

Then, the internal EGR is adjusted by the exhaust sub-lift mechanism (E-SVEL) 1 in the cold state. The combustion tends to degrade even in the spark ignition combustion in the cold state, and thus the internal EGR amount is adjusted by the sub-lift control excluding the maximum load Td. At the load Ta in the vicinity of the idling in the cold state, the sub-lift of the exhaust valves 124 is in a sub-lift amount Sac. This sub-lift amount Sac is a lift amount smaller than the sub-lift amount Sa for the compression self-ignition combustion, but the internal EGR is carried out by means of the sub-lift control across the entire load region. It should be noted that a sub-lift amount Sdc is set to a zero lift by the sub-lift control through the exhaust sub-lift control mechanism (E-SVEL) 1 at the full load Td maximum in a heat generation amount, and the sub-lift control is substantially suppressed or stopped. Therefore, the internal EGR is suppressed to an extremely small amount.

Incidentally, if the sub-lift amount Sac in the cold state is set to a sub-lift amount S as high as the sub-lift amount Sa in the compression self-ignition combustion when the warmup is completed, the combustion torque (fresh air) is insufficient in the cold state in which the mechanical friction of the internal combustion engine is large, and the engine stalls. Therefore, the sub-lift amount S is set to be small.

Moreover, in the cold state, the exhaust-side hydraulic valve timing control mechanism (E-VTC) 2 is controlled to advance from that in the warm state, and is thus advanced by the crank angle Xe (vane angle θe) compared with the exhaust valve lift in the warm state on the lower side (during the warm operation) of FIG. 11. As a result, as illustrated in the characteristic diagram on the upper side (during the cold operation) of FIG. 11, the open timing for the sub-lift amount Sac by the exhaust sub-lift control mechanism (E-SVEL) 1 is a phase retarded by an angle XaL from the top dead center (TDC), and the opening is carried out before the angle XaH in the warm state. As a result, the following effects are obtained.

In other words, the internal EGR can be promoted so as to introduce the high temperature exhaust gas into the combustion chamber by means of the sub-lift control by the exhaust sub-lift control mechanism (E-SVEL) 1 starting from a relatively early stage of the intake stroke. As a result, a mixture between the fresh air and the high-temperature exhaust gas excellently progresses. Thus, the above-mentioned stratification phenomenon due to temperature (effective in the compression self-ignition combustion) is less liable to occur. As a result, more homogeneous gas temperature increase is provided, and the spark ignition combustion in the cold state is improved. Further, the warmup of the internal combustion engine is promoted, which also advantageously works in the reduction in the exhaust emission.

On this occasion, the valve lift of the exhaust valves 124 in the exhaust stroke simultaneously advances, and hence the open timing (EVO) and the close timing (EVC) of the exhaust valves 124 advance. Thus, the following effects are acquired. In other words, as a result of the advance in the open timing (EVO) of the exhaust valves 124, the exhaust valves 124 open in the state in which the combustion gas temperature is high. Therefore, the temperature of the discharged exhaust gas increases, and the downstream three-way catalyst is thus warmed, resulting in an increase in a catalyst inversion rate. Moreover, as a result of the advance in the close timing (EVC) of the exhaust valves 124, the combustion gas is sealed and compressed in the combustion chamber before the exhaust top dead center. Immediately thereafter, the combustion gas bursts on the intake pipe side when the intake valves 123 are opened. Thus, an intake flow is agitated, and the intake flow is increased. Therefore, such an effect that the combustion is further improved can be expected.

As illustrated in FIG. 7A, a default position of the exhaust-side hydraulic timing mechanism (E-VTC) 2 is the most advanced position, and actions and effects of the advanced phase of an exhaust sub-lift curve in the intake stroke and an exhaust lift curve in the exhaust stroke as illustrated in the characteristic diagram on the upper side (during the cold operation) of FIG. 11 are surely acquired at a beginning of the start combustion.

On the other hand, the intake-side hydraulic timing mechanism (I-VTC) 3 is similarly controlled to be at the most advanced position in the cold state, and a range from IVCa to IVCd of the close timing (IVC) of the intake valves 123 of FIG. 13 is approximately constant in the vicinity of the bottom dead center (BDC). Thus, such an effect that the combustion is improved in the cold state is obtained by an effective compression ratio increase effect resulting from this. Moreover, the default position of the intake-side hydraulic timing mechanism (I-VTC) 3 is also this most advanced position, and the above-mentioned combustion improvement effect provided by the advance in the close timing (IVC) of the intake valves 123 is similarly surely acquired at the beginning of the start combustion.

A brief description is now given of characteristic configurations and actions and effects thereof in this embodiment.

According to this embodiment, in the first operating region in which the compression self-ignition combustion is carried out, the mechanical compression ratio change control by the variable mechanical compression ratio control mechanism (VCR) is suppressed so as to maintain the mechanical compression ratio in the vicinity of the approximately constant mechanical compression ratio, and the internal EGR amount change control by the exhaust sub-lift control mechanism (E-SVEL) of the variable valve actuating control mechanism (VVA) is preferentially carried out so as to actively adjust the internal EGR amount. As a result, the combustion stability in the compression self-ignition combustion on the low load side can be increased. Moreover, in the second operating region in which the spark ignition combustion is carried out, the internal EGR amount change control by the exhaust sub-lift control mechanism (E-SVEL) is suppressed so as to substantially maintain the internal EGR amount to be an extremely small amount, and the mechanical compression ratio change control by the variable mechanical compression ratio control mechanism (VCR) is preferentially carried out so as to actively decrease and adjust the mechanical compression ratio. As a result, the anti-knocking capability and the combustion stability are increased, and the combustion noise of the spark ignition combustion can further be suppressed.

Moreover, the variable mechanical compression ratio control mechanism (VCR) maintains the approximately maximum mechanical compression ratio in the first operating region, and thus a compression top dead center temperature can be maximally increased by the approximately maximum mechanical compression ratio in the first operating region. As a result, the compression self-ignition combustion can be further stabilized. In the second operating region, while the knocking (abnormal combustion) in the spark ignition combustion, which tends to occur as the load increases, is suppressed by decreasing the mechanical compression ratio in a state in which the knocking does not occur as the load increases, the thermal efficiency can be maintained to be high by maintaining the mechanical compression ratio to be as high as possible. As a result, the combustion can be improved so as to increase the fuel efficiency both in the first and second operating regions.

Moreover, in the first operating region, the exhaust sub-lift control mechanism (E-SVEL) increases the internal EGR amount as the load decreases so that the high temperature internal EGR amount can increases as the load decreases, while the ignition property of the compression self-ignition combustion decreases as the load decreases. As a result, the ignition property of the compression self-ignition combustion increases, resulting in stability of the combustion. In the second operating region, the high temperature internal EGR amount is reduced and suppressed by suppressing or stopping introduction of the internal EGR by the exhaust sub-lift control mechanism (E-SVEL). As a result, the temperature increase in the gas in the combustion chamber is suppressed. Further, the anti-knocking capability in the spark ignition combustion increases, and the combustion noise can be decreased.

Moreover, in the first operating region, the close timing (IVC) of the intake valves is maintained to be in the vicinity of the bottom dead center (BDC). Thus, the effective compression ratio can be increased, the ignition property of the compression self-ignition combustion can be increased, and the combustion stability can be increased. In the second operating region, the close timing (IVC) of the intake valves is retarded from the vicinity of the bottom dead center (BDC) at the maximum load as the load decreases. Thus, the effective compression ratio can be decreased so as to increase the anti-knocking capability in the spark ignition combustion, and to decrease the pumping loss.

Moreover, the third operating region in which the combined combustion using both the compression self-ignition combustion and the spark ignition combustion is carried out is set between the first operating region and the second operating region. Thus, when the operation transitions between the first operating region and the second operating region, the occurrence of the instability of the combustion can be suppressed.

Moreover, the spark ignition combustion is carried out in the entire region in the cold state of the internal combustion engine. Thus, such a problem that the ignition property of the compression self-ignition combustion decreases in the cold state can be avoided. As a result, an excellent combustion of the internal combustion engine can be realized in the cold state by the spark ignition combustion.

Further, in the cold state, a predetermined amount of the high temperature exhaust gas is introduced by the internal EGR action of the exhaust sub-lift control mechanism (E-SVEL). Simultaneously, the variable mechanical compression ratio control mechanism (VCR) reduces the compression ratio to the approximately minimum mechanical compression ratio. The combustion in the cold state can thus be improved by the high temperature exhaust gas. Moreover, the exhaust temperature is increased by decreasing the mechanical compression ratio (=expansion ratio), thereby promoting the increase in the temperature of the three-way catalyst. Thus, the inversion rate is increased, resulting in a decrease in the exhaust emission.

Second Embodiment

Figure 14:
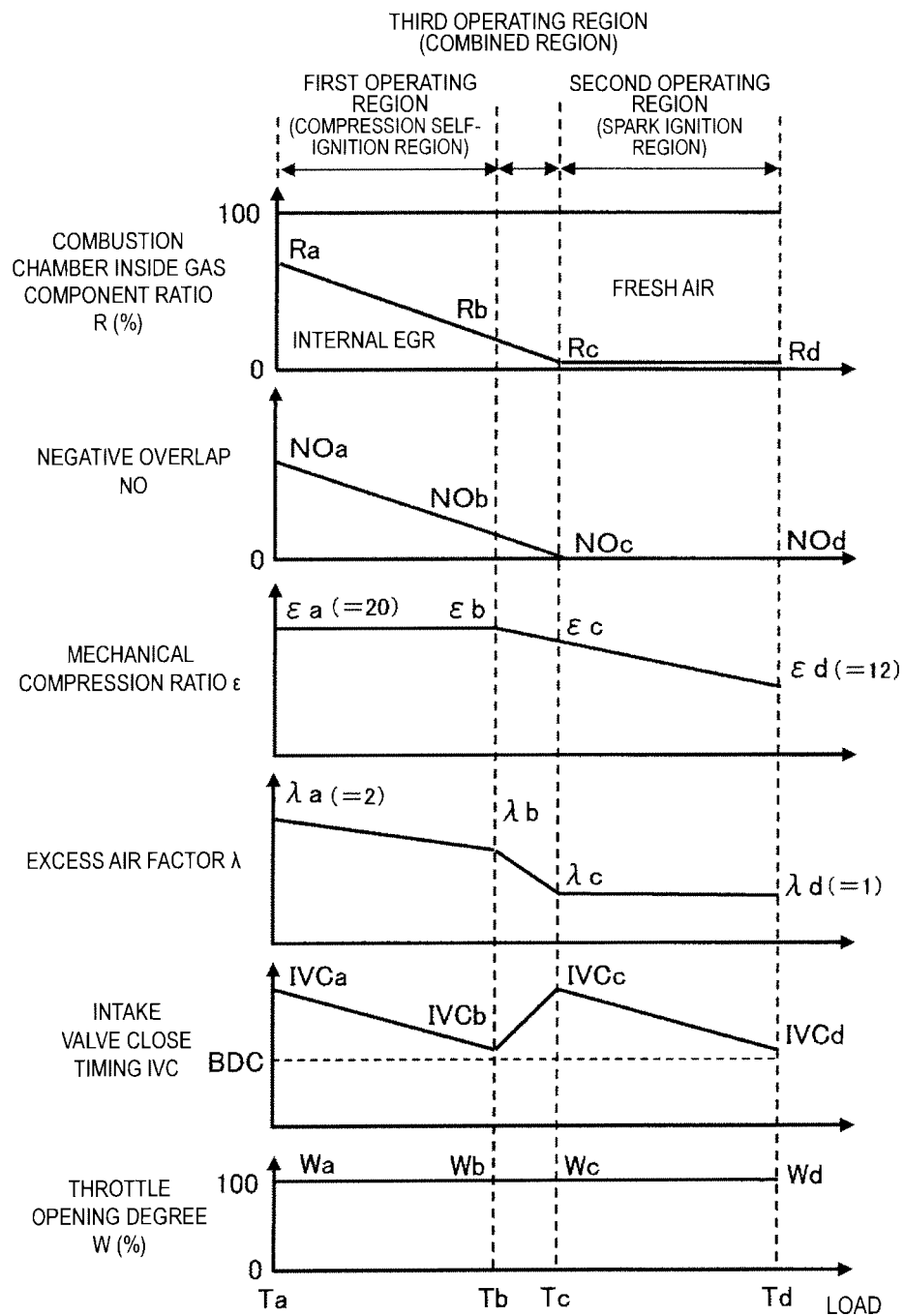
FIG. 14 is an explanatory diagram illustrating control characteristics of respective control parameters with respect to the load in the variable combustion system according to another embodiment of the present invention.
Figure 15:
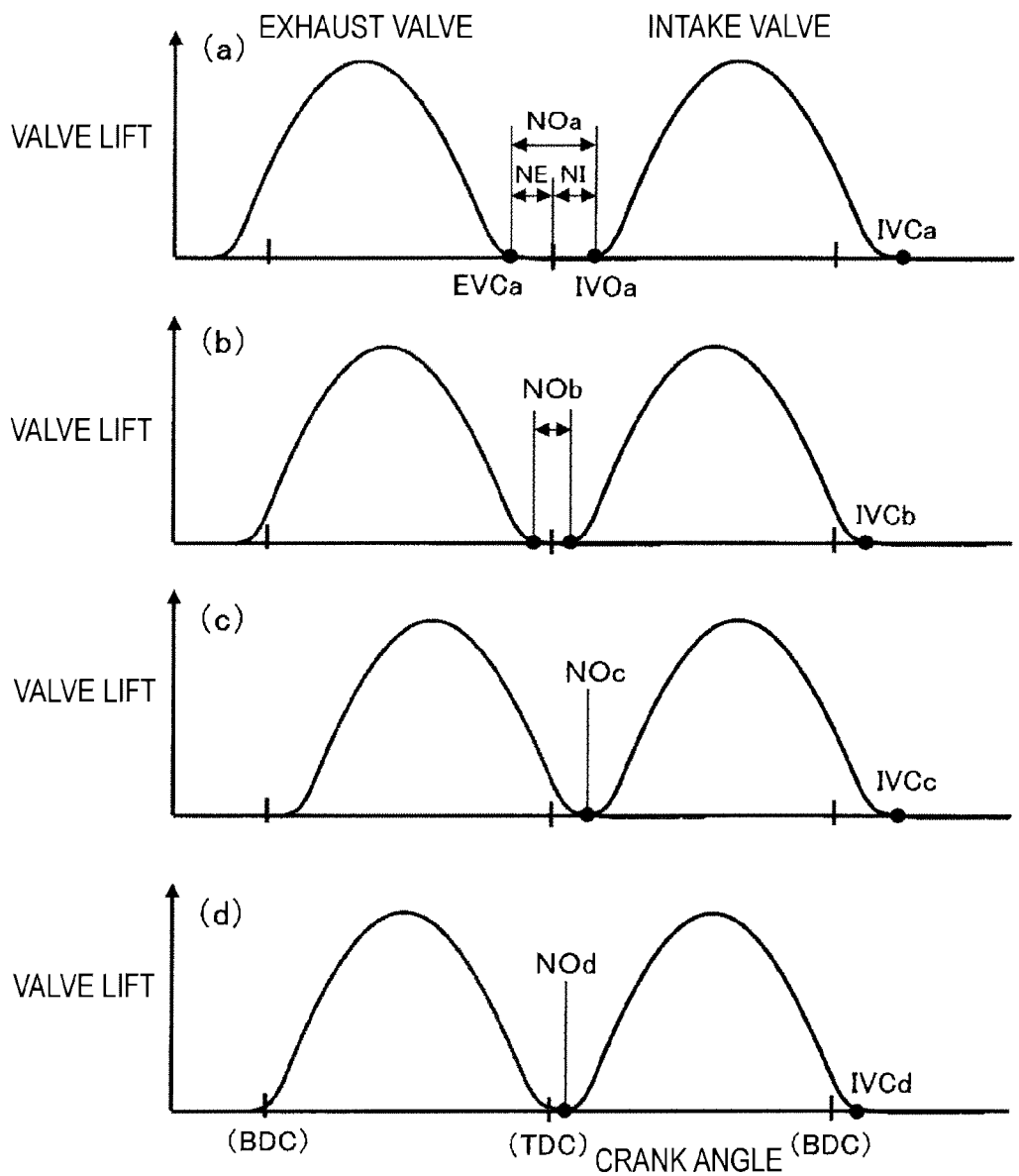
FIG. 15 is an explanatory diagram illustrating relationships between a phase and a lift of the intake valves and the exhaust valves by the variable valve actuating control mechanism (VVA) illustrated in FIG. 14.

Referring to FIGS. 14 and 15, a description is now given of a second embodiment of the present invention. While, according to the first embodiment, the internal EGR amount is controlled by using the exhaust sub-lift control mechanism (E-SVEL) 1, this embodiment is different in such a point that the internal EGR amount is controlled by a negative valve overlap between the intake valves 123 and the exhaust valves 124. Therefore, according to this embodiment, the exhaust-side hydraulic valve timing control mechanism (E-VTC) 2 and the intake-side hydraulic valve timing control mechanism (I-VTC) 3 are used, but the exhaust-side sub-lift control mechanism (E-SVEL) 1 is not used. Thus, according to this embodiment, the exhaust-side hydraulic valve timing control mechanism (E-VTC) 2 and the intake-side hydraulic valve timing control mechanism (I-VTC) 3 are together included in a variable valve actuating control mechanism (VVA). Meanwhile, the exhaust-side sub-lift control mechanism (E-SVEL) 1 may be provided.

The combustion operating regions during the warm operation are the same as those of FIG. 9 according to the first embodiment, and the control parameters in the respective regions are basically the same. However, in order to control the internal EGR amount, operations of the exhaust-side hydraulic valve timing control mechanism (E-VTC) 2 and the intake-side hydraulic valve timing control mechanism (I-VTC) 3 are particularly controlled.

In FIGS. 14 and 15, the first operating region for the compression self-ignition combustion is considered. The internal EGR ratio is Ra at the load Ta during the idling, and is thus the same as that of the first embodiment. However, the internal EGR ratio is not realized by the exhaust sub-lift control mechanism (E-SVEL), but by a large negative valve overlap of a phase angle NOa illustrated in part (a) of FIG. 15. This negative valve overlap NOa means a phase angle between a close timing (EVCa) of the exhaust valves 124 before the top dead center (TDC) and an open timing (IVOa) of the intake valves 123 after the top dead center (TDC).

In other words, the negative valve overlap NOa means a section in which the close timing (EVCa) of the exhaust valves 124 before the top dead center (TDC) and the open timing (IVOa) of the intake valves 123 after the top dead center (TDC) do not overlap, and both the intake valves 123 and the exhaust valves 124 are closed. According to this embodiment, the residual amount of the residual exhaust gas (=internal EGR) is adjusted by adjusting the phase angle of the negative valve overlap.

In the second half of the exhaust stroke, the exhaust valves 124 are closed at the close diming (EVCa) before the top dead center (TDC), and the high temperature residual exhaust gas after the combustion is sealed in the combustion chamber 104 at this time point. The pressure in the combustion chamber 104 at this time point is at the level of the atmospheric pressure. Then, the residual exhaust gas is compressed up to the top dead center of the exhaust stroke, and the pressure in the combustion chamber 104 increases. However, the intake valves 123 are not opened, but are closed in this state. The combustion gas thus still remains, and the intake valves 123 open at the open timing (IVOa) around a time point when the pressure in the combustion chamber returns to the original level after the piston moves downward again.

Thus, the high temperature residual exhaust gas (=internal EGR) hardly flows backward to the intake port 121 side, but remains in the vicinity of a top of the combustion chamber 104. The suction of the fresh air from the intake ports can be started by the downward movement of the piston, and a required amount of the internal EGR can be secured in the combustion chamber 104. Then, the above-mentioned temperature stratification phenomenon occurs in the combustion chamber 104. Thus, the compression self-ignition combustion starts from parts at high temperatures, and the combustion smoothly propagates to the low temperature side. The explosive combustion noise caused by simultaneous combustion in the combustion chamber 104, which tends to constitute a problem in the compression self-ignition combustion, is less liable to occur. As a result, the compression self-ignition combustion region having a high fuel efficiency can be extended to the high load region side, resulting in a further increase in the fuel efficiency performance in an actual travel.

For this purpose, it is preferred that a phase angle NE between the close timing (EVCa) of the exhaust valves 124 and the top dead center (TDC), and a phase angle NI between the open timing (IVOa) of the intake valves 123 and the top dead center (TDC) have such a relationship as "phase angle NE≈phase angle NI", which means that NE and NI are approximately the same phase angle, or "phase angle NE<phase angle NI". In this way, the ratio Ra of the internal EGR similar to that of the first embodiment can be acquired. Even if the load further increases, and reaches the maximum load Tb in the first operating region, when, while the relationship "phase angle NE≈phase angle NI" is secured, the negative valve overlap is reduced to Nob, the ratio Rb of the internal EGR similar to that of the first embodiment can be secured.

The negative valve overlap amount can be controlled in this way by using the exhaust-side hydraulic valve timing control mechanism (E-VTC) 2 and the intake-side hydraulic valve timing control mechanism (I-VTC) 3 to control the open phase and the close phase of the intake valves 123 and the exhaust valves 124. Part (a) of FIG. 15 illustrates the negative valve overlap amount NOa at the load Ta, part (b) of FIG. 15 illustrates the negative valve overlap amount NOb at the load Tb, part (c) of FIG. 15 illustrates a negative valve overlap amount NOc at the load Tc, and part (d) of FIG. 15 illustrates a negative valve overlap amount NOd at the load Td. Further, the control method for the internal EGR amount by using the negative valve overlap directly controls the residual exhaust gas amount sealed in the combustion chamber 104 by the close timing (EVC) of the exhaust valves 124 and the open timing (IVO) of the intake valves 123, and thus has such a feature that the control response is high.

On this occasion, the close timing (IVC) of the intake valves 123 is also changed incidentally by the control of the negative valve overlap. Thus, the control of the load is adjusted by the excess air factor λ while the change in the close timing (IVC) of the intake valves 123 is assumed. For example, as illustrated in FIG. 14, at the load Ta, the close timing (IVCa) of the intake valves 123 is considerably later than the bottom dead center, and the charging efficiency is smaller than that of the first embodiment. As a result, the excess air factor λ is accordingly set to, for example, approximately λa=2, and is controlled so as to be slightly richer than λa=3 according to the first embodiment. On the other hand, at the load Tb, the close timing (IVCb) of the intake valves 123 is similar to that of the first embodiment, and the excess air factor λb at this time is similar to that of the first embodiment.

In this way, according to this embodiment, in the first operating region in which the compression self-ignition combustion is carried out, the mechanical compression ratio change control by the variable mechanical compression ratio control mechanism (VCR) is suppressed so as to maintain a constant mechanical compression ratio, and the internal EGR amount change control by the negative valve overlap of the exhaust-side hydraulic valve timing control mechanism (E-VTC) 2 and the intake-side hydraulic valve timing control mechanism (I-VTC) 3 of the variable valve actuating control mechanism (VVA) is preferentially carried out so as to actively adjust the internal EGR amount. As a result, the combustion stability in the compression self-ignition combustion on the low load side can be increased.

Then, control substantially the same as that of the first embodiment is carried out in the second operating region on the high load side. In other words, the spark ignition combustion is carried out in the range from the load Tc to the maximum load Td. When the operation transitions to this region, the negative valve overlap by the exhaust-side hydraulic valve timing control mechanism (E-VTC) 2 and the intake-side hydraulic valve timing control mechanism (I-VTC) 3 is maintained to be approximately zero as represented by NOc and Nod, to thereby control the internal EGR to an extremely small value.

Moreover, the mechanical compression ratio $\epsilon$ is decreased by the variable mechanical compression ratio control mechanism (VCR) as the load increases, to thereby suppress an excessive increase in the gas temperature in the vicinity of the compression top dead center. Moreover, the negative valve overlap is substantially maintained to be zero, and hence the high temperature internal EGR amount (=residual exhaust gas amount) is controlled to be an extremely small amount. As a result, an influence of the internal EGR on the gas temperature in the combustion chamber 104 is small, and the knocking (abnormal combustion) phenomenon concerned in the spark ignition combustion region can be suppressed while the reduction control of the mechanical compression ratio $\epsilon$ by the variable mechanical compression ratio control mechanism (VCR) mostly eliminates the adverse effect of the high temperature internal EGR. In other words, the knocking tends to occur as the load increases in the internal combustion engine. Thus, while the mechanical compression ratio is controlled to be the maximum mechanical compression ratio that can suppress the knocking, the mechanical compression ratio $\epsilon$ is decreased as much as possible as the load increases, and the mechanical compression ratio is reduced to a mechanical compression ratio around $\epsilon=12$ at the full load Td. As a result, while the knocking is suppressed, the thermal efficiency can be increased so as to increase the fuel efficiency in the spark ignition combustion region. Further, according to this embodiment, the mechanical compression ratio is reduced to $\epsilon d=12$ at the maximum load. Thus, not only the knocking but also a combustion speed and an increase rate $(dP/d\theta)$ of the combustion pressure can be suppressed, and such a phenomenon that the combustion noise rapidly increases, which is concerned in Japanese Patent Application Laid-open No. 2013-227941 (Patent Document 1), can be avoided.

Further, the control of the load (engine torque value) in the second operating region is mainly carried out by the control of the close timing (IVC) of the intake valves 123. In other words, as illustrated in the characteristic diagram on the lower side of FIG. 11 (during the warm operation), at the minimum load Tc in the second operating region, the intake lift curve is maximally retarded, and the close timing (IVC) of the intake valves 123 is the most retarded angle IVCc. The close timing (IVC) of the intake valves 123 is significantly retarded from the bottom dead center (BDC), and thus a larger amount of the fresh air sucked in the combustion chamber 104 in the intake stroke is discharged again to the intake system after the bottom dead center (BDC). Therefore, the fresh air charging efficiency in the combustion chamber 104 decreases, and the engine torque, which is the load, is suppressed to the minimum load Tc in the second operating region.

Then, when the load is increased, the close timing (IVC) of the intake valves 123 is gradually advanced, and the close timing (IVC) of the intake valves 123 at the maximum load Td is the most advanced angle IVCd. Incidentally, when the close timing of the intake valves 123 is changed in order to meet the load, the effective compression ratio is changed by the close timing of the intake valves 123. Thus, the mechanical compression ratio $\epsilon$ needs to be adjusted. Therefore, the variable mechanical compression ratio control mechanism (VCR) adjusts the mechanical compression ratio $\epsilon$ to a limit that does not cause the knocking while the change in the close timing of the intake valves 123 is assumed. As a result, the variable mechanical compression ratio control mechanism (VCR) controls the mechanical compression ratio to continuously decrease from EC to Ed between the load Tc and the maximum load Td.

As described above, according to this embodiment, in the second operating region in which the spark ignition combustion is carried out, the internal EGR amount change control by the negative valve overlap of the exhaust-side hydraulic valve timing control mechanism (E-VTC) 2 and the intake-side hydraulic valve timing control mechanism (I-VTC) 3 is suppressed so as to maintain the internal EGR amount to be an extremely small amount, and the mechanical compression ratio change control by the variable mechanical compression ratio control mechanism (VCR) is preferentially carried out so as to actively decrease and adjust the mechanical compression ratio. As a result, the anti-knocking capability and the combustion stability can be increased, and the combustion noise of the spark ignition combustion can further be suppressed.

Then, in the third operating region which is set between the first operating region and the second operating region, and in which both the compression self-ignition combustion and the spark ignition combustion are carried out, while the negative valve overlap is being controlled, the control substantially the same as that of the first embodiment is carried out. In a region slightly above the load Tb of the first operating region, most of the mixture is combusted by the compression self-ignition combustion, and unburnt mixture is spark-ignition combusted by the spark ignition of the ignition plug 105. On the other hand, the compression self-ignition combustion is difficult in a region slightly below the load Tc of the second operating region. In other words, as the load increases, an explosive abnormal combustion may occur when only the compression self-ignition combustion is carried out. Therefore, the EGR amount is reduced so as to suppress the compression self-ignition combustion, and, while a part of the mixture is compression self-ignition combusted, the remaining majority of the mixture is spark ignition combusted by the ignition plug 105. As a result, occurrence of unstable combustion is suppressed during the transition between the first operating region and the second operating region. In this way, in the third operating region, both the compression self-ignition combustion and the spark ignition combustion are used, resulting in the generation of a stable engine torque (load).

In this way, the respective control parameters are not switched stepwise between the first operating region and the second operating region, but are adjusted so as to continuously change in the third operating region. As a result, the partial compression self-ignition combustion and the partial spark ignition combustion are enabled, resulting in the stable combustion.

In addition to the above-mentioned embodiments, the present invention can be embodied as in the following modified example. In other words, as the form of the variable valve actuating mechanism for controlling the internal EGR, the embodiment in which the sub-lift amount of the exhaust valves is changed and the embodiment in which the negative valve overlap is changed are described, but other forms may be employed. For example, the following embodiment may be employed. The intake valves 123 and the exhaust valves 124 may be controlled so as to cause a positive valve overlap (both the intake valves and the exhaust valves open at the same time) by the exhaust-side hydraulic valve timing control mechanism (E-VTC) and the intake-side hydraulic valve timing control mechanism (I-VTC), and the exhaust gas (combustion gas) is controlled to flow backward as the internal EGR through the exhaust valves to the combustion chamber during the valve overlap section by using an exhaust pulsation. Further, in addition to the internal EGR, an external EGR may simultaneously be employed. In this case, the anti-knocking capability is relatively increased by the low temperature external EGR, and such an effect that the control range of the mechanical compression ratio by the variable mechanical compression ratio control mechanism (VCR) can be reduced accordingly is obtained.

Moreover, as an example of the variable mechanical compression ratio control mechanism (VCR), the embodiment of changing the position on the piston side by means of the link is described, but such a configuration as to change a position on the combustion chamber side may be employed. Further, as the internal combustion engine to be applied, according to this embodiment, the internal combustion engine in which the gasoline is injected into the combustion chamber is described, but the present invention can be applied to an internal combustion engine using a composite fuel acquired by mixing alcohol or a diesel fuel with the gasoline. In this way, a specific configuration of the embodiment is not particularly limited as long as the configuration does not depart from the gist of the present invention.

As described above, according to the present invention, the variable valve actuating control mechanism (VVA) for controlling the internal EGR amount and the variable mechanical compression ratio control mechanism (VCR) for controlling the mechanical compression ratio are installed on the internal combustion engine. The mechanical compression ratio change control by the variable mechanical compression ratio control mechanism (VCR) is suppressed, and the internal EGR amount change control by the variable valve actuating control mechanism (VVA) is preferentially carried out in the first operating region in which the compression self-ignition combustion is carried out. The internal EGR amount change control by the variable valve actuating control mechanism (VVA) is suppressed, and the mechanical compression ratio change control by the variable mechanical compression ratio control mechanism (VCR) is preferentially carried out in the second operating region in which the spark ignition combustion is carried out. As a result, the combustion stability in the compression self-ignition combustion on the low load side can be increased, the anti-knocking capability and the combustion stability in the spark ignition combustion on the high load side can be increased, and further the combustion noise of the spark ignition combustion can be suppressed. A description is now given of technical ideas other than those described in Scope of Claims, which are recognized from the respective embodiments and the like.

(a) Such a feature that the variable mechanical compression ratio control mechanism maintains the mechanical compression ratio to be high in the first operating region, and decreases the mechanical compression ratio as the load increases in the second operating region is provided.

(b) Such a feature that when the engine is cold, the spark ignition combustion is carried out in the entire region is provided.

(c) Such a feature that when the engine is cold, a predetermined amount of the internal EGR is introduced by the variable valve actuating mechanism, and the mechanical compression ratio is reduced to the approximately minimum mechanical compression ratio by the variable mechanical compression ratio control mechanism is provided.

The present invention is not limited to the above-mentioned embodiments, and can include various modified examples. For example, the above-mentioned embodiments are detailed for the sake of a description for easily understanding the present invention, and the present invention is not limited to a case including all the described configurations. Moreover, a part of a configuration of a certain embodiment can be replaced by a configuration of another embodiment, and, to a configuration of a certain embodiment, a configuration of another embodiment can be added. Moreover, to a part of the configuration of each of the embodiments, another component can be added, or the part can be deleted or replaced by another component.

(1) A variable combustion system for an internal combustion engine, comprising: a variable valve actuation control mechanism configured to control an internal EGR amount to a combustion chamber of an internal combustion engine; a variable mechanical compression ratio control mechanism configured to control a mechanical compression ratio in the combustion chamber; and a control device configured to switch a combustion form of a mixture in the combustion chamber of the internal combustion engine to any one of compression self-ignition combustion and spark ignition combustion and to control the variable valve actuating control mechanism and the variable mechanical compression ratio control mechanism, wherein the control device suppresses mechanical compression ratio change control by the variable mechanical compression ratio control mechanism and carries out internal EGR amount change control by the variable valve actuating control mechanism on a preferential basis in a first operating region in which the compression self-ignition combustion is carried out, and the control device suppresses the internal EGR amount change control by the variable valve actuating control mechanism and carries out the mechanical compression ratio change control by the variable mechanical compression ratio control mechanism on a preferential basis in a second operating region in which the spark ignition combustion is carried out.

(2) A variable combustion system for an internal combustion engine according to (1), wherein the control device suppresses the mechanical compression ratio change control by the variable mechanical compression ratio control mechanism so as to maintain the mechanical compression ratio to be in a vicinity of a predetermined mechanical compression ratio and carries out the internal EGR amount change control by the variable valve actuating control mechanism on a preferential basis so as to adjust the internal EGR amount in the first operating region in which the compression self-ignition combustion is carried out, and the control device suppresses the internal EGR amount change control by the variable valve actuating control mechanism so as to suppress the internal EGR amount to a predetermined amount and carries out the mechanical compression ratio change control by the variable mechanical compression ratio control mechanism on a preferential basis so as to adjust the mechanical compression ratio in the second operating region in which the spark ignition combustion is carried out.

(3) A variable combustion system for an internal combustion engine according to (2), wherein the control device controls the variable mechanical compression ratio control mechanism to maintain a high mechanical compression ratio in the first operating region, and to reduce the mechanical compression ratio as a load increases in the second operating region.

(4) A variable combustion system for an internal combustion engine according to (2), wherein the control device controls the variable valve actuating control mechanism to reduce the internal EGR amount in response to an increase in a load in the first operating region, and controls the variable valve actuating control mechanism to suppress the internal EGR amount to a small amount in the second operating region.

(5) A variable combustion system for an internal combustion engine according to (2), wherein the control device controls the variable mechanical compression ratio control mechanism to maintain an approximately maximum mechanical compression ratio in the first operating region, and to reduce the mechanical compression ratio as a load increases in the second operating region, and controls the variable valve actuating control mechanism to reduce the internal EGR amount in response to an increase in the load in the first operating region, and to suppress the internal EGR amount to a small amount in the second operating region.

(6) A variable combustion system for an internal combustion engine according to (2), wherein: the variable valve actuating control mechanism comprises an exhaust sub-lift control mechanism configured to open an exhaust valve in an intake stroke; and the control device changes a lift characteristic of the exhaust sub-lift control mechanism so as to change the internal EGR amount.

(7) A variable combustion system for an internal combustion engine according to (2), wherein: the variable valve actuating control mechanism comprises an intake-side valve timing control mechanism; and the control device holds a close timing of an intake valve of the intake-side valve timing control mechanism in a vicinity of a bottom dead center in the first operating region, and advances the close timing of the intake valve toward a close timing in the vicinity of the bottom dead center at a maximum load in response to an increase in a load in the second operating region.

(8) A variable combustion system for an internal combustion engine according to (2), wherein a third operating region in which combination combustion of both the compression self-ignition combustion and the spark ignition combustion is carried out is set between the first operating region and the second operating region.

(9) A variable combustion system for an internal combustion engine according to (8), wherein the first operating region is set to a region in which a load is low, the second operating region is set to a region in which the load is high, and the third operating region is set to a region between the low load and the high load.

(10) A variable combustion system for an internal combustion engine according to (2), wherein: the variable valve actuating control mechanism controls an exhaust-side valve timing control mechanism to set a close timing of an exhaust valve to a timing before a top dead center, and controls an intake-side valve timing control mechanism to set an open timing of an intake valve to a timing after the top dead center; and the control device controls a section of a negative valve overlap determined by the close timing of the exhaust valve and the open timing of the intake valve so as to adjust the internal EGR amount.

(11) A variable combustion system for an internal combustion engine according to (10), wherein the control device sets a section between the close timing of the exhaust valve and the top dead center and a section between the top dead center and the open timing of the intake valve to approximately the same phase angle.

(12) A variable combustion system for an internal combustion engine according to any one of (1) to (11), wherein the control device carries out the compression self-ignition combustion in the first operating region, the spark ignition combustion in the second operating region, and the combination combustion in the third operating region which is added depending on need, in a warm state in which warmup of the internal combustion engine has been completed, and the control device carries out the spark ignition combustion in an entire operating region in a cold state in which the warmup has not been completed.

(13) A variable combustion system for an internal combustion engine according to (12), wherein, in the spark ignition combustion carried out in the cold state of the internal combustion engine, the control device controls the variable mechanical compression ratio control mechanism to maintain an approximately minimum mechanical compression ratio, and controls the variable valve actuating control mechanism to reduce the internal EGR amount as a load increases.

(14) A variable combustion system for an internal combustion engine, comprising: a variable valve actuating control mechanism configured to control an internal EGR amount to a combustion chamber of an internal combustion engine; and a variable mechanical compression ratio control mechanism configured to control a mechanical compression ratio in the combustion chamber, the variable combustion system being capable of switching a combustion form of a mixture in the combustion chamber of the internal combustion engine to any one of compression self-ignition combustion and spark ignition combustion, wherein: in a first operating region in which the compression self-ignition combustion is carried out, the variable mechanical compression ratio control mechanism carries out one of stopping of mechanical compression ratio change control, maintaining of a control amount to be constant, and reduction in a change amount in the control amount, and the variable valve actuating control mechanism carries out internal EGR amount change control; and in a second operating region in which the spark ignition combustion is carried out, the variable valve actuating control mechanism carries out one of stopping of the internal EGR amount change control, maintaining of a control amount to be constant, and reduction in a change amount in the control amount, and the variable mechanical compression ratio control mechanism carries out the mechanical compression ratio change control.

According to an embodiment of the present invention, the combustion stability in the compression self-ignition combustion on the low load side may be increased, and/or the anti-knocking capability and the combustion stability in the spark ignition combustion on the high load side may be increased, and/or the combustion noise of the spark ignition combustion may be suppressed.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

This application claims priority to Japanese Patent Application No. 2014-185231 filed on Sep. 11, 2014. The entire disclosure of Japanese Patent Application No. 2014-185231 filed on Sep. 11, 2014 including specification, claims, drawings and summary is incorporated herein by reference in its entirety.

The entire disclosure of Japanese Patent Application Publication Nos. 2013-227941, 2002-276446, and H11-264319 including specification, claims, drawings and summary is incorporated herein by reference in its entirety.

What is claimed is:

1. A variable combustion system for an internal combustion engine, comprising:
a variable valve actuation control mechanism configured to control an internal EGR amount to a combustion chamber of an internal combustion engine;
a variable mechanical compression ratio control mechanism configured to control a mechanical compression ratio in the combustion chamber; and
a control device configured to switch a combustion form of a mixture in the combustion chamber of the internal combustion engine to any one of compression self-ignition combustion and spark ignition combustion and to control the variable valve actuating control mechanism and the variable mechanical compression ratio control mechanism,
wherein the control device suppresses mechanical compression ratio change control by the variable mechanical compression ratio control mechanism and carries out internal EGR amount change control by the variable valve actuating control mechanism on a preferential basis in a first operating region in which the compression self-ignition combustion is carried out, and
the control device suppresses the internal EGR amount change control by the variable valve actuating control mechanism and carries out the mechanical compression ratio change control by the variable mechanical compression ratio control mechanism on a preferential basis in a second operating region in which the spark ignition combustion is carried out.

2. A variable combustion system for an internal combustion engine according to claim 1, wherein the control device suppresses the mechanical compression ratio change control by the variable mechanical compression ratio control mechanism so as to maintain the mechanical compression ratio to be in a vicinity of a predetermined mechanical compression ratio and carries out the internal EGR amount change control by the variable valve actuating control mechanism on a preferential basis so as to adjust the internal EGR amount in the first operating region in which the compression self-ignition combustion is carried out, and
the control device suppresses the internal EGR amount change control by the variable valve actuating control mechanism so as to suppress the internal EGR amount to a predetermined amount and carries out the mechanical compression ratio change control by the variable mechanical compression ratio control mechanism on a preferential basis so as to adjust the mechanical compression ratio in the second operating region in which the spark ignition combustion is carried out.

3. A variable combustion system for an internal combustion engine according to claim 2, wherein the control device controls the variable mechanical compression ratio control mechanism to maintain a high mechanical compression ratio in the first operating region, and to reduce the mechanical compression ratio as a load increases in the second operating region.

4. A variable combustion system for an internal combustion engine according to claim 2, wherein the control device controls the variable valve actuating control mechanism to reduce the internal EGR amount in response to an increase in a load in the first operating region, and controls the variable valve actuating control mechanism to suppress the internal EGR amount to a small amount in the second operating region.

5. A variable combustion system for an internal combustion engine according to claim 2, wherein the control device controls the variable mechanical compression ratio control mechanism to maintain an approximately maximum mechanical compression ratio in the first operating region, and to reduce the mechanical compression ratio as a load increases in the second operating region, and controls the variable valve actuating control mechanism to reduce the internal EGR amount in response to an increase in the load in the first operating region, and to suppress the internal EGR amount to a small amount in the second operating region.

6. A variable combustion system for an internal combustion engine according to claim 2, wherein:
the variable valve actuating control mechanism comprises an exhaust sub-lift control mechanism configured to open an exhaust valve in an intake stroke; and
the control device changes a lift characteristic of the exhaust sub-lift control mechanism so as to change the internal EGR amount.

7. A variable combustion system for an internal combustion engine according to claim 2, wherein:
the variable valve actuating control mechanism comprises an intake-side valve timing control mechanism; and
the control device holds a close timing of an intake valve in a vicinity of a bottom dead center by the intake-side valve timing control mechanism in the first operating region, and advances the close timing of the intake valve toward a close timing in the vicinity of the bottom dead center at a maximum load in response to an increase in a load in the second operating region.

8. A variable combustion system for an internal combustion engine according to claim 2, wherein:
a third operating region in which combination combustion of both the compression self-ignition combustion and the spark ignition combustion is carried out is set between the first operating region and the second operating region, and
the control device switches the combustion form of a mixture in the combustion chamber of the internal combustion engine to the combination combustion of both the compression self-ignition combustion and the spark ignition combustion in the third operating region.

9. A variable combustion system for an internal combustion engine according to claim 8, wherein the first operating region is set to a region in which a load is low, the second operating region is set to a region in which the load is high, and the third operating region is set to a region between the low load and the high load.

10. A variable combustion system for an internal combustion engine according to claim 2, wherein:
the variable valve actuating control mechanism controls an exhaust-side valve timing control mechanism to set a close timing of an exhaust valve to a timing before a top dead center, and controls an intake-side valve timing control mechanism to set an open timing of an intake valve to a timing after the top dead center; and
the control device controls a section of a negative valve overlap determined by the close timing of the exhaust valve and the open timing of the intake valve so as to adjust the internal EGR amount.

11. A variable combustion system for an internal combustion engine according to claim 10, wherein the control device sets a section between the close timing of the exhaust valve and the top dead center and a section between the top dead center and the open timing of the intake valve to approximately the same phase angle.

12. A variable combustion system for an internal combustion engine according to claim 2, wherein the control device carries out the compression self-ignition combustion in the first operating region and the spark ignition combustion in the second operating region in a warm state in which warmup of the internal combustion engine has been completed, and carries out the spark ignition combustion in an entire operating region in a cold state in which the warmup has not been completed.

13. A variable combustion system for an internal combustion engine according to claim 12, wherein, in the spark ignition combustion carried out in the cold state of the internal combustion engine, the control device controls the variable mechanical compression ratio control mechanism to maintain an approximately minimum mechanical compression ratio, and controls the variable valve actuating control mechanism to reduce the internal EGR amount as a load increases.

14. A variable combustion system for an internal combustion engine, comprising:
a variable valve actuating control mechanism configured to control an internal EGR amount to a combustion chamber of an internal combustion engine; and
a variable mechanical compression ratio control mechanism configured to control a mechanical compression ratio in the combustion chamber,
the variable combustion system being capable of switching a combustion form of a mixture in the combustion chamber of the internal combustion engine to any one of compression self-ignition combustion and spark ignition combustion, wherein:
in a first operating region in which the compression self-ignition combustion is carried out, the variable mechanical compression ratio control mechanism carries out one of stopping of mechanical compression ratio change control, maintaining of a control amount to be constant, and reduction in a change amount in the control amount, and the variable valve actuating control mechanism carries out internal EGR amount change control; and
in a second operating region in which the spark ignition combustion is carried out, the variable valve actuating control mechanism carries out one of stopping of the internal EGR amount change control, maintaining of a control amount to be constant, and reduction in a change amount in the control amount, and the variable mechanical compression ratio control mechanism carries out the mechanical compression ratio change control.

* * * * *